(12) United States Patent
Ichihara et al.

(10) Patent No.: US 6,826,144 B1
(45) Date of Patent: Nov. 30, 2004

(54) OPTICAL RECORDING MEDIUM, OPTICAL RECORDING AND/OR REPRODUCING METHOD, AND OPTICAL RECORDING AND/OR REPRODUCING SYSTEM

(75) Inventors: Katsutaro Ichihara, Yokohama (JP); Akira Kikitsu, Yokohama (JP); Toshihiko Nagase, Kawasaki (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 867 days.

(21) Appl. No.: 09/648,475

(22) Filed: Aug. 25, 2000

(30) Foreign Application Priority Data

Aug. 25, 1999 (JP) .......................................... 11-238095

(51) Int. Cl.$^7$ ................................................ G11B 7/00
(52) U.S. Cl. ...................................... 369/288; 369/100
(58) Field of Search .......................... 369/13.38, 13.39, 369/275.1, 275.2, 94, 283, 284, 288, 53.2, 53.34, 53.35, 100, 275.5, 47.19; 428/64.2, 64.3, 64.4

(56) References Cited

U.S. PATENT DOCUMENTS 6,385,162 B1 * 5/2002 Nagase et al. .............. 369/288

FOREIGN PATENT DOCUMENTS

JP 11-273149 10/1999

OTHER PUBLICATIONS

Kasami et al, "Premastered Optical Disk by Supperresolution Using Rear Aperture Detection", Jpn., J. Appl. Phys., 1996, vol. 35 pp., 423–428.

Nagase et al, "Super–Resolution Effect of Semiconductor–Doped Glass", Jpn., J. Appl. Phys., 1999, vol. 38 pp. 1665–1668.

U.S. patent application Ser. No. 09/272,783, Nagase et al., filed Mar. 19, 1999.

U.S. patent application Ser. No. 09/042,542, Ichihara et al., filed Mar. 17, 1998.

* cited by examiner

Primary Examiner—Thang V. Tran
Assistant Examiner—Bach Vuong
(74) Attorney, Agent, or Firm—Pillsbury Winthrop LLP

(57) ABSTRACT

An optical recording medium comprises a superresolution film which has a light transmittance varying in accordance with the intensity of incident light and which has a superresolution function for optically masking part of incident light to form an optical aperture having a smaller size than a spot size of incident light, the superresolution film including at least two kinds of superresolution films having different response times until the superresolution function occurs after being irradiated with light. Thus, it is possible to easily and surely reduce the light spot size to greatly enhance the recording density. In addition, it is possible to extend the operating wavelength range by providing at least two kinds of superresolution films having different operating wavelengths causing the superresolution function.

16 Claims, 12 Drawing Sheets

OPTICAL RECORDING MEDIUM, OPTICAL RECORDING AND/OR REPRODUCING METHOD, AND OPTICAL RECORDING AND/OR REPRODUCING SYSTEM

BACKGROUND OF THE INVENTION

The present invention relates generally to an optical recording medium, an optical recording and/or reproducing method and an optical recording and/or reproducing system. More specifically, the invention relates to an optical recording medium which has a phase change type optical recording layer irradiated with light beams for reproducing and recording/reproducing information and which has a greatly improved recording density and an extended operating wavelength range by utilizing a superresolution function, and an optical recording and/or reproducing method and optical recording and/or reproducing system which is capable of providing a greatly improved recording density and an extended operating wavelength range by utilizing a superresolution function.

Optical recording media, which are irradiated with light beams for reproducing or recording/reproducing information, have been put to practical use, for various data files, such as voice data, image data and computer data, as recording devices having large capacity, rapid accessibility and medium portability, and the development thereof is expected in future. As an example of an optical recording medium, an optical disk will be described below.

As measures to enhance the density of optical disks, there are various approaches, such as the shortening of the wavelength of gas laser for an original disk cutting, the shortening of the wavelength of a semiconductor laser serving as an operating light source, the increase of the numerical aperture of an objective lens and the decrease of the thickness of an optical disk substrate. Moreover, in the case of recordable optical disks, there are various approaches, such as the mark length record and the land group record.

As effective density enhancing techniques other than these approaches, the "superresolution function" has been proposed and studied. This is a function which is obtained in a "superresolution film". The "superresolution film" means a film having a characteristic that an optical response varies non-linearly in accordance with the intensity of irradiated light.

That is, generally used laser beams have a light-intensity distribution which is like a Gaussian distribution. The superresolution film has different response characteristics to the central portion (high intensity portion) and peripheral portion (low intensity portion) of such a light beam. By such a spatial difference in optical response, an optical mask or aperture is formed in the central or peripheral portion of an incident light spot to reduce an effective spot size, so that a high-density recording and/or reproducing can be carried out.

At first, such a superresolution function was proposed as a technique which is special to optical magnetic disks. That is, optical magnetic disks use a medium wherein a magnetic film having the superresolution function is switched-connected or magnetostatic-connected to a recording layer or a reproducing layer. Then, during irradiation with regenerative light, the temperature of the film is raised to utilize the exchange force or magnetostatic force between layers, so that an optical mask or optical aperture to a part of a regenerative spot is formed in a superresolution film.

Thereafter, a proposal for using a film material, which has a non-linearly varying optical response, without using magnetic functions, was made with respect to a read only memory disk. It was found that this proposal was applicable to all types of optical disks, such as optical recording ROM media, optical recording phase-change media and dye type recordable media, in addition to optical magnetic recording media.

Such superresolution reproducing methods and superresolution reproducing films capable of being applied to various optical disks are divided broadly into a heat mode system and a photon mode system. As disclosed in, e.g., ISOM'98-Technical Digiest (P126), the former system is designed to irradiate a superresolution film with regenerative light to heat the superresolution to cause a phase transition, such as melting, in the superresolution film to change the transmittance thereof. In this system, the response time up to the formation of an optical aperture or mask is relatively long. As disclosed in, e.g., ISOM '98-Technical Digiest (p128), the latter photon mode system is designed to irradiate a superresolution film with generative light to cause the electron transition in the superresolution film to change the light transmittance by the absorption saturated phenomenon. The photon mode system is characterized in that the response time up to the formation of an optical aperture or mask is relatively short.

However, conventional optical recording media having superresolution films are limited to those having a monolayer superresolution film. However, in the case of the monolayer, there is a problem in that it is difficult to reduce the size of the optical aperture and to ensure a practical operating wavelength margin.

SUMMARY OF THE INVENTION

It is therefore an object of the present invention to eliminate the aforementioned problems and to provide an optical recording medium, an optical recording and/or reproducing method and an optical recording and/or reproducing system, wherein it is possible to greatly reduce the size of an optical aperture and to provide a higher density.

It is another aspect of the present invention to provide an optical recording medium, an optical recording and/or reproducing method and an optical recording and/or reproducing system, which can easily ensure a practical operating wavelength margin.

In order to accomplish the aforementioned and other objects, according to one aspect of the present invention, an optical recording medium comprises a superresolution film which has a light transmittance varying in accordance with the intensity of incident light and which has a superresolution function for optically masking part of incident light to form an optical aperture having a smaller size than a spot size of incident light, the superresolution film including at least two kinds of superresolution materials having different response times until the superresolution function occurs after being irradiated with light.

With the above described construction, it is possible to easily and surely reduce the light spot size to greatly enhance the recording density.

If the superresolution film comprises at least two kinds of stacked superresolution films having different response times until the superresolution function occurs after being irradiated with light, it is possible to easily and surely reduce the light spot size via only a portion in common between the apertures of the two kinds of superresolution films, so that it is possible to greatly enhance the recording density.

Moreover, if the apertures formed in the at least two kinds of superresolution films when being irradiated with a light beam for writing or reading data partially overlap with each other, it is possible to easily and surely reduce the light spot size via only a portion in common between the apertures of the two kinds of superresolution films, so that it is possible to greatly enhance the recording density.

According to another aspect of the present invention, an optical recording medium comprises a superresolution film which has a light transmittance varying in accordance with the intensity of incident light and which has a superresolution function for optically masking part of incident light to form an optical aperture having a smaller size than a spot size of incident light, the superresolution film including at least two kinds of superresolution materials having different operating wavelengths causing the superresolution function.

With the above described construction, it is possible to greatly extend the operating wavelength range.

If the superresolution film comprises at least two kinds of stacked superresolution films having different operating wavelengths causing the superresolution function, it is possible to surely, easily and greatly extend the operating wavelength range.

In addition, if at least one kind of the at least two kinds of superresolution films is a superresolution film causing the superresolution function on the basis of electron transition, it is possible to easily select the response speed and operating wavelength by using a superresolution film of a photon mode system.

Moreover, if at least one kind of the at least two kinds of superresolution films is a superresolution film causing the superresolution function on the basis of temperature rise, it is possible to easily select the response speed and operating wavelength by using a superresolution film of a heat mode system.

According to another aspect of the present invention, an optical reproducing method comprises the steps of: preparing at least two kinds of superresolution films, each of which has a light transmittance varying in accordance with the intensity of incident light and each of which has a superresolution function for optically masking part of incident light to form an optical aperture having a smaller size than a spot size of incident light, the at least two kinds of superresolution films having different response times until the superresolution function occurs after being irradiated with light; irradiating the at least two kinds of superresolution films with a light beam for reading data so that the apertures formed in the at least two kinds of superresolution films partially overlap with each other, to irradiate an optical recording face of an optical recording medium with the optical beam via the optical apertures partially overlapping with each other; and detecting reflection of the light beam, with which the optical recording face is irradiated, to read data.

With the above described construction, it is possible to easily and surely reduce the light spot size to greatly enhance the recording density.

According to another aspect of the present invention, an optical reproducing method comprises the steps of: preparing at least two kinds of superresolution films, each of which has a light transmittance varying in accordance with the intensity of incident light and each of which has a superresolution function for optically masking part of incident light to form an optical aperture having a smaller size than a spot size of incident light, the at least two kinds of superresolution films having different operating wavelengths causing the superresolution function; irradiating the at least two kinds of superresolution films with a light beam for reading data to irradiate an optical recording face of an optical recording medium with the optical beam via the optical apertures; and detecting reflection of the light beam, with which the optical recording face is irradiated, to read data.

With the above described construction, it is possible to greatly extend the operating wavelength range.

According to a further aspect of the present invention, an optical reproducing system comprises: light irradiating means for irradiating at least two kinds of superresolution films, each of which has a light transmittance varying in accordance with the intensity of incident light and each of which has a superresolution function for optically masking part of incident light to form an optical aperture having a smaller size than a spot size of incident light, the at least two kinds of superresolution films having different response times until the superresolution function occurs after being irradiated with light, with a light beam for reading data so that the apertures formed in the at least two kinds of superresolution films partially overlap with each other, to irradiate an optical recording face of an optical recording medium with the optical beam via the optical apertures partially overlapping with each other; and data reproducing means for detecting reflection of the light beam, with which the optical recording face is irradiated by the light irradiating means, to read data.

With the above described construction, it is possible to easily and surely reduce the light spot size to greatly enhance the recording density.

According to a still further aspect of the present invention, an optical reproducing system comprises: light irradiating means for irradiating at least two kinds of superresolution films, each of which has a light transmittance varying in accordance with the intensity of incident light and each of which has a superresolution function for optically masking part of incident light to form an optical aperture having a smaller size than a spot size of incident light, the at least two kinds of superresolution films having different operating wavelengths causing the superresolution function, with a light beam for writing or reading data to irradiate an optical recording face of an optical recording medium with the optical beam via the optical apertures; and data reproducing means for detecting reflection of the light beam, with which the optical recording face is irradiated by the light irradiating means, to read data.

With the above described construction, it is possible to greatly extend the operating wavelength range.

According to the present invention, the spot size of a light beam for reproducing or recording information can be effectively reduced by stacking a plurality of superresolution films having different response times to irradiation with light. As a result, it is possible to improve spatial resolution and to realize a higher density optical recording.

In addition, according to the present invention, the wavelength margin of a light beam for reproducing or recording information can be extended by stacking a plurality of superresolution films having different operating wavelengths. That is, it is not required to strictly manage the wavelength of laser light which is a light source, so that it is possible to simplify the recording and/or reproducing system.

As described in detail above, according to the present invention, it is possible to realize a higher density optical recording with a simple construction to provide great industrial merits.

BRIEF DESCRIPTION OF THE DRAWINGS

The present invention will be understood more fully from the detailed description given herebelow and from the accompanying drawings of the preferred embodiments of the invention. However, the drawings are not intended to imply limitation of the invention to a specific embodiment, but are for explanation and understanding only.

In the drawings.

DESCRIPTION OF THE PREFERRED EMBODIMENTS

Referring now to the accompanying drawings, the preferred embodiments of the present invention will be described below.

First Preferred Embodiment

First, as the first preferred embodiment of the present invention, a technique for reducing the size of an optical aperture by preparing multilayer superresolution films (or a monolayer mixed with a plurality of superresolution materials having different response times).

Figure 1:
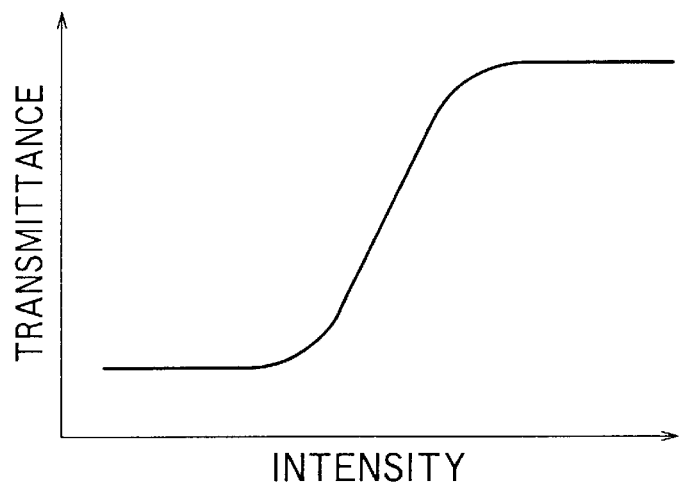
FIG. 1 is a graph showing a typical light transmittance characteristic of a superresolution film.

FIG. 1 is a graph showing a typical light transmittance characteristic of a superresolution film. That is, this figure shows the dependence of the light transmittance on the intensity of irradiation light.

Figure 2:
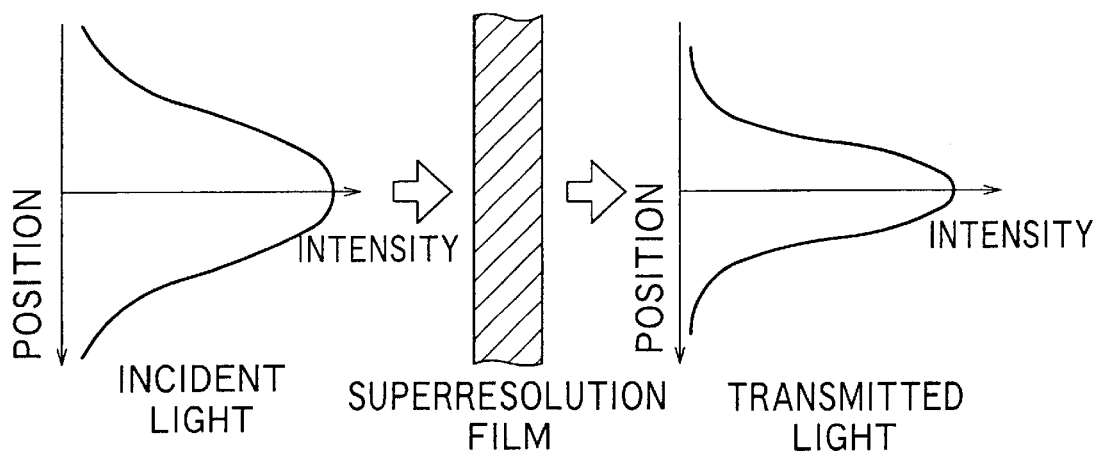
FIG. 2 is a conceptual diagram showing a basic function of a superresolution film.

FIG. 2 is a conceptual diagram showing a basic function of a superresolution film.

As shown in FIG. 1 as an example, the light transmittance of the superresolution film varies in accordance with the intensity of irradiation light. In the example of FIG. 1, the light transmittance is low when the intensity of irradiation light is low, and the light transmittance increases as the intensity of irradiation light increases. As shown in FIG. 2 as an example, if light having a Gaussian intensity distribution is incident on a superresolution film having such a characteristic, the high intensity portion of the incident light near the center of the light spot selectively passes through the film, and the low intensity portion of the incident light in the peripheral portion thereof is selectively shaded, so that the spot size of the transmitted light is smaller than that of the incident light. If light thus reduced is incident on the data recording surface of an optical recording medium, this is effectively equivalent to the shortening of the operating wavelength, so that it is possible to provide an improved resolution to enhance the quality of regenerative signals or provide an improved recording density.

FIGS. 1 and 2 show an example of the case where the light transmittance of the superresolution film increases as the intensity of irradiation light increases. To the contrary, the light transmittance may decrease as the intensity of irradiation light increases. In that case, an optical mask is formed in the central portion of the spot of the incident light, and an aperture is formed in the peripheral portion thereof.

In addition, although the above described optical aperture or mask may be formed by the variation in extinction coefficient (an imaginary number part k of a complex index of refraction), the optical aperture or mask may be formed by the variation in real number part n of the complex index of refraction with respect to the intensity of light. Also in this case, optical interference conditions vary in accordance with the spatial variation in real number part n, so that it is possible to spatially vary the light transmittance.

The response time will be considered below. The response time depends on the material of the superresolution film. In general, the response time in the heat mode system is slow, and the response time in the photon mode is rapid. When data stored in the optical recording medium are read out or when data are recorded in the optical recording medium, the light spot rapidly moves relatively with respect to the medium. Therefore, taking account of the response time, the position of the optical aperture or mask formed in the superresolution film is not directly below the light spot, and lags toward the trailing edge (in the opposite direction to the traveling direction of the light spot).

Figure 3:
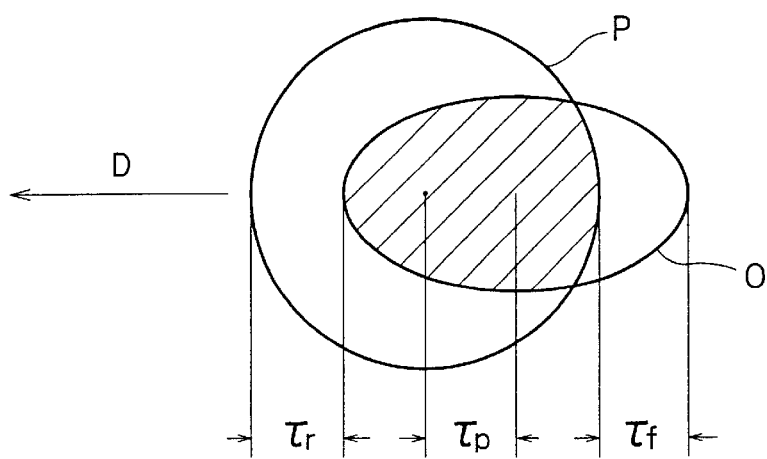
FIG. 3 is a conceptual diagram showing the relationship between the positions of a light spot and an optical aperture when taking account of a constant response time.

FIG. 3 is a conceptual diagram showing the relationship between the positions of a light spot and an optical aperture when taking account of a constant response time. That is, if the superresolution film is irradiated with a light spot P, an optical aperture O having a smaller size than the spot diameter of the light spot P is formed. Since the formation of the optical aperture O requires a predetermined response time, the light spot P is shifted in the traveling direction D thereof in the response time. In the example of FIG. 3, since the optical aperture O is formed after the predetermined response time, a part of the optical aperture O projects to the outside of the light spot P. As a result, the light actually passing through the superresolution film corresponds only to a portion (oblique line portion) in common between the light spot P and the optical aperture O. That is, an optical reproduction or optical recording is carried out by a fine beam passing through the portion in common between the light spot P and the optical aperture O. As a result, it is possible to improve the spatial resolution to enhance the recording density. Furthermore, reference symbols τr, τp and τf in FIG. 3 will be described in detail later.

On the other hand, the inventor has made the present invention providing a unique construction that a plurality of superresolution films having different response times are combined. That is, the optical aperture reducing technique as the first preferred embodiment of the present invention utilizes the difference between the response times of the plurality of superresolution films.

Figure 4A:
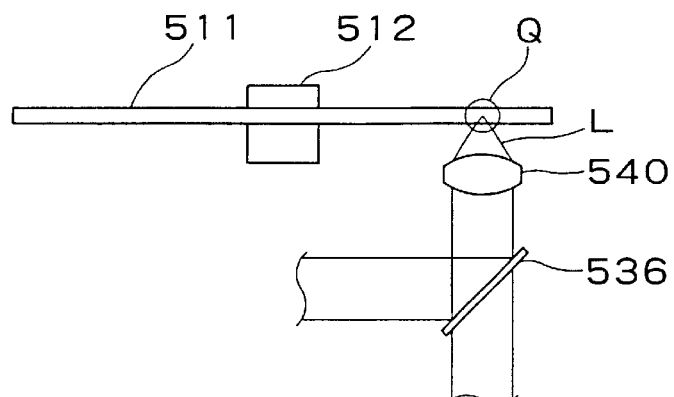
FIG. 4A shows a part of an optical recording and/or reproducing system where an optical disk 511 is detachably mounted and rotated by a spindle motor 512.
Figure 4B:
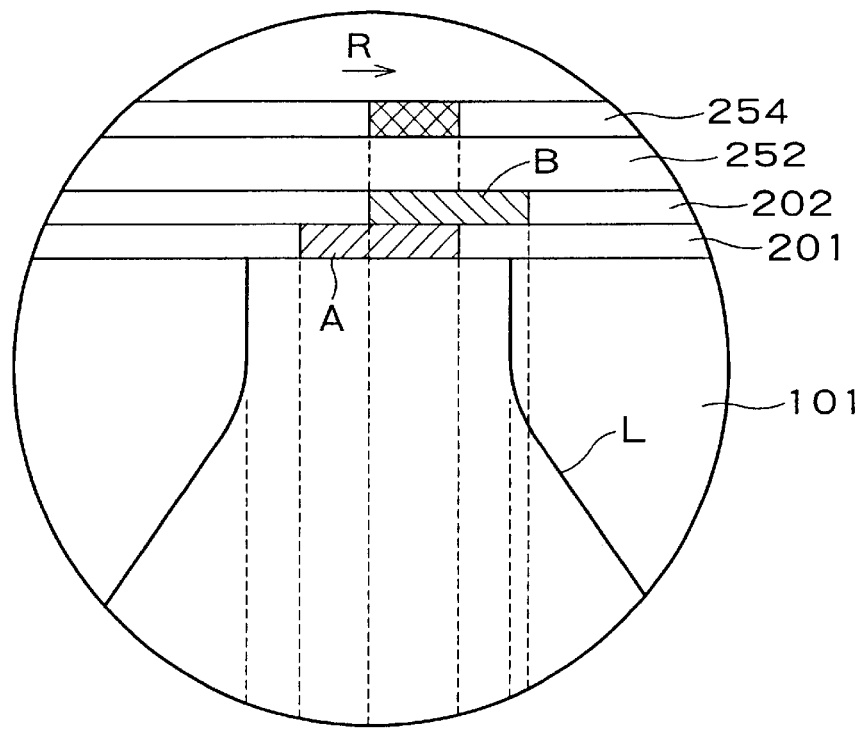
FIG. 4B is an enlarged cross-sectional view of the irradiated point Q shown in FIG. 4A.
Figure 4C:
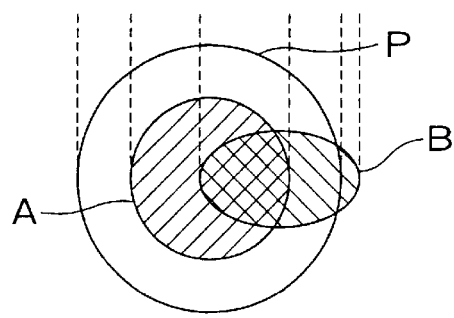
FIG. 4C shows a schematic planar view of incident beam spot and the optical apertures of the superresolution films.

FIGS. 4A–4C are conceptual diagrams showing an example of an optical aperture when a superresolution film having a short response time is combined with a superresolution film having a relatively longer response time. FIG. 4A shows a part of an optical recording and/or reproducing system where an optical disk 511 is detachably mounted and rotated by a spindle motor 512. A laser beam L is irradiated on the recording surface of the disk 511 through half mirror 536 and objective lens 540. The enlarged cross-sectional view of the irradiated point Q is shown in FIG. 4B.

As shown in FIG. 4B, the disk 511 has a layered structure including, for example, a first superresolution film 201, a second superresolution film 202, an optical interference film 252 and a recording film 254 on a transparent substrate 101. The laser beam L is converged into a nearly parallel beam within a depth of focus of the lens 540. This parallel beam is launched into the layered structure of the disk 511.

The disk 511 is rotated in a direction shown by the arrow R in the figure. The first superresolution film 201 has a shorter response time and the second superresolution film 202 has a relatively longer response time.

FIG. 4C shows a schematic planar view of incident beam spot and the optical apertures of the superresolution films. In the figure, reference symbol P denotes a beam spot of the incident laser beam L, reference symbol A denotes an optical aperture which is formed by a superresolution film 201, and reference symbol B denotes an optical aperture which is formed by a superresolution film 202, respectively.

Since the optical aperture A has the short response time, the optical aperture A is formed immediately after being irradiated with light. Therefore, the position of the aperture at the instant of the formation thereof is substantially the center of the light spot P. On the other hand, since the optical aperture B is formed after the predetermined response time as described referring to FIG. 3, the light spot P is shifted in a direction opposite to the traveling direction R when the aperture B has been formed.

Therefore, the light passing through the superresolution films 201 and 202 thus combined is limited only to the portion (cross-hatched portion) in common between the optical aperture A and the optical aperture B. That is, as can be seen from the comparison with FIG. 3, it is possible to further reduce the size of an effective reproducing (recording) spot to improve the spatial resolution to realize a high density recording.

The beam reducing effect as shown in FIGS. 4A–4C as an example can be suitably optimized in accordance with the kind of the adopted superresolution films and the recording and/or reproducing conditions (linear velocity, irradiation power, etc.). In a desired combination of superresolution films, one is a superresolution film of a photon mode system utilizing an electron transition, and the other is a superresolution film of a heat mode system.

However, if a semiconductor is used among superresolution films belonging to the photon mode system, the response time varies in accordance with the kind of the semiconductor. In addition, if a film including semiconductor fine grains dispersed in a matrix, not a semiconductor continuous film, is used as a superresolution film, the response time can be varied by the size and density of the semiconductor fine grains and the kind of the matrix material. Therefore, both of two kinds of superresolution films 201 and 202 may be superresolution films of the photon mode system represented by the semiconductor system.

In addition, since the response time can be varied if the light absorption factor or the like is varied even in the case of the heat mode system, both of two kinds of superresolution films 201 and 202 may be superresolution films of the heat mode system.

The order of the stacking of two or more kinds of superresolution films may be determined by taking account of, e.g., the sensitivity of the respective superresolution films. That is, in general, a film having a low sensitivity, i.e., a film having a higher irradiation light intensity required to increase the light transmittance in FIG. 1, is preferably provided on the incident side of light beams.

The response time of superresolution films for use in the present invention can be examined as follows. That is, a sample being at rest is irradiated with a light beam (pump light) as a pulse, which has a power capable of forming an optical aperture, and simultaneously, the irradiated portion is irradiated with a light beam as a probe light, which has a power capable of forming no optical aperture. If the time response of the transmittance is measured by the probe light, it is possible to know the time response of the superresolution film.

Figure 5:
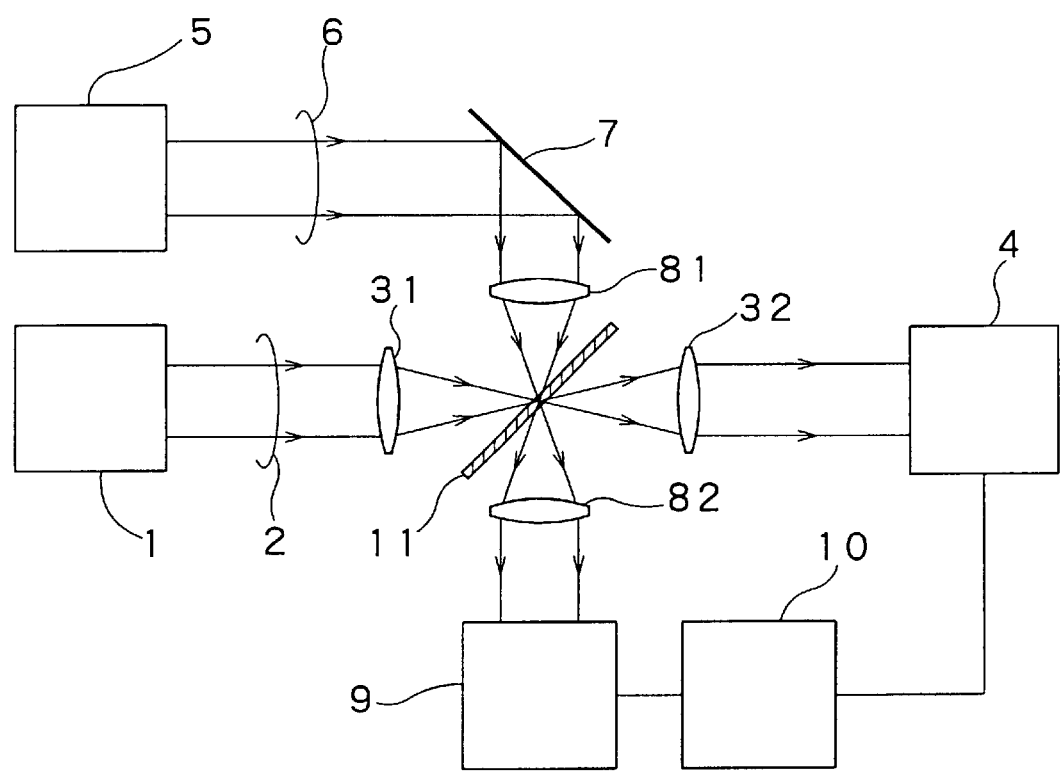
FIG. 5 is a schematic block diagram of an evaluating system for examining a time response of a superresolution film.

FIG. 5 is a schematic block diagram an evaluating system for examining the time response of a superresolution film. In FIG. 5, reference number 1 denotes a pump light source, and reference number 2 denotes an optical path for pump light, reference numbers 31 and 32 denoting objective lenses for pump light, reference number 3 denoting a power monitor for pump light, reference number 5 denoting a probe light source, reference number 6 denoting an optical path for probe light, reference number 7 denoting a reflecting mirror, reference numbers 81 and 82 denoting objective lenses for probe light, reference number 9 denoting a power monitor for probe light, reference number 10 denoting an oscilloscope, and reference number 11 denoting a superresolution film serving as a sample.

While the sample 11 is continuously irradiated with probe light, the sample 11 is pulse-irradiated with pump light. If the transmittance of the superresolution film is varied by the irradiation with pump light, the transmittance of the probe light varies, so that the intensity of the monitored light varies. The irradiation power density of the pump light may be controlled by adjusting the relative positions of a focal point, which is formed by the objective lens 31, and the sample 11. The sample 11 is irradiated with probe light at a smaller spot size than that of pump light, in order to efficiently detect the variation in transmittance.

As an example, the sample 11 was irradiated with pump light having a pulse rising time (a time required to rise from a 10% intensity of the peak intensity to a 90% intensity of thereof) of about 2 nanoseconds and a pulse width of 10 nanoseconds to examine the time variation in transmittance using probe light. The wavelengths of the pump light and probe light may be selected in accordance with the operating wavelength of the superresolution film. For the pump light, a wavelength variable dye laser based on YAG laser excitation was used at a wavelength of 660 nm, and for the probe light, a laser diode (LD) (semiconductor laser) having a wavelength of 660 nm was used.

Figure 6:
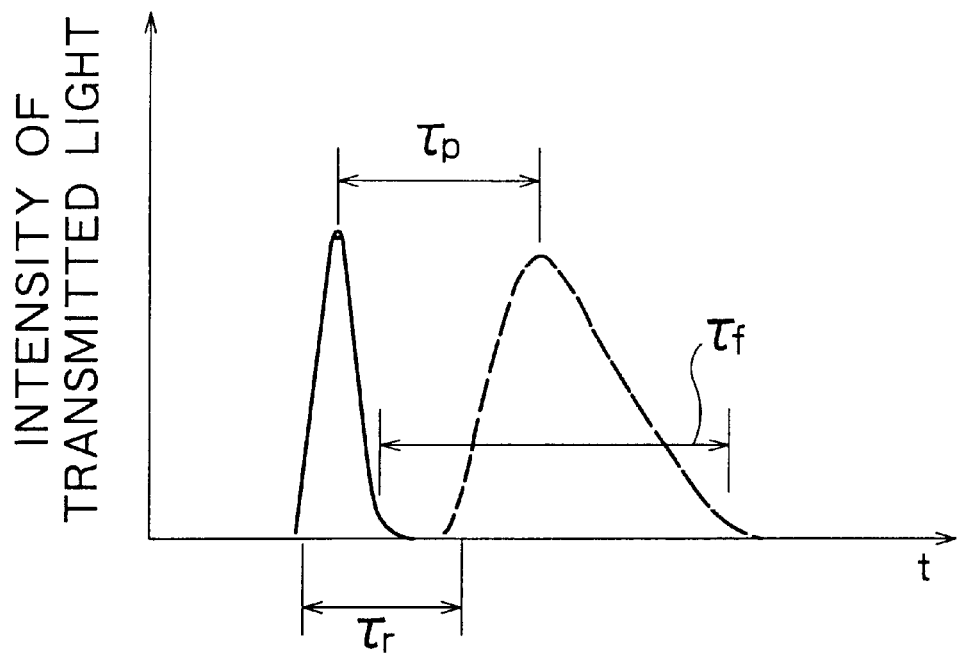
FIG. 6 is a graph showing a typical example of a response characteristic of a superresolution film.

FIG. 6 is a graph showing a typical example of a response characteristic of a superresolution film. That is, this figure shows the variation in intensity of transmitted light with respect to time, wherein the solid line denotes pump light and the broken line denotes the measured value of the probe light. As "response times", three kinds of times $\tau r$, $\tau p$ and $\tau f$ can be defined as shown in the figure.

The time $\tau r$ is a period of time from the rising of the intensity of pump light (a time at which the intensity reaches 10% of the peak intensity) to the rising of light passing through the superresolution film. The time $\tau p$ is a period of time until the intensity of light passing through the superresolution film reaches its peak after the intensity of pump light reaches its peak. The time $\tau f$ is a period of time from the falling of the intensity of pump light (a time at which the intensity falls to 10% of the peak intensity) to the falling of light passing through the superresolution film.

These three kinds of response times $\tau$ depend on the characteristics of the superresolution film. If these response times are caused to correspond to the beam profile shown in FIG. 3, the shifted quantity between the leading edges (the end portions in the spot traveling direction) of the light spot P and optical aperture O mainly corresponds to the $\tau r$, the shifted quantity between the centers of the light spot P and optical aperture O mainly corresponds to the $\tau p$, and the shifted quantity between the trailing edges (the end portions opposite to the light spot traveling direction) of the light spot P and optical aperture O mainly corresponds to the $\tau f$.

If the trailing edge of the optical aperture O is positioned outside of the light spot P as shown in FIG. 3 as an example, the outside projecting portion does not contribute to reproducing (or recording). Throughout the specification, the $\tau p$ will be used as the response time unless the response time is particularly specified.

Examples of First Preferred Embodiment

Examples of the first preferred embodiment of the present invention will be described below.

Figure 7:
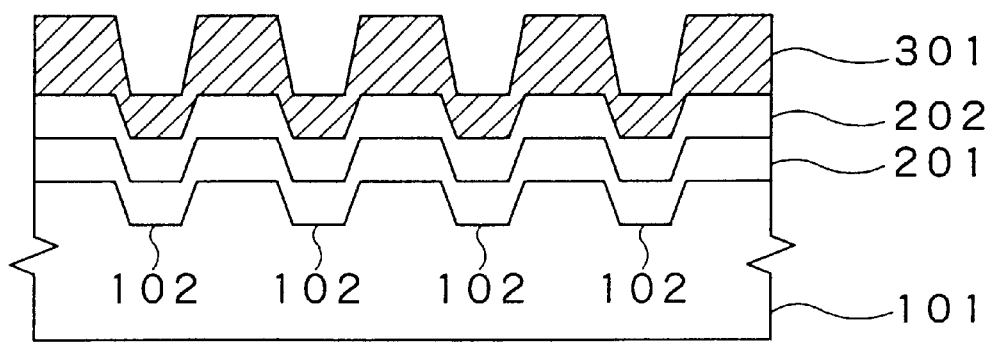
FIG. 7 is a conceptual diagram showing an example of a sectional structure of a read only memory optical disk according to the present invention.

FIG. 7 is a conceptual diagram showing an example of a sectional structure of a read only memory optical disk according to the present invention. That is, in FIG. 7, reference number 101 denotes an optical disk substrate, and reference number 102 denotes pre-pit signals formed on the surface of the substrate, reference number 201 denoting a first superresolution film, reference number 202 denoting a second superresolution film and reference number 301 denoting a reflecting film.

In FIG. 7, the substrate 101 is irradiated with light beams from the bottom, and the reflecting light from the reflecting film 301 is monitored to read pre-pit information. Furthermore, in conventional read only memory optical disks, a reflecting film is formed directly on a pre-pit without using any superresolution films, or even if a film having a superresolution function is provided, such a film is substantially a monolayer and has a single time response.

The pre-pit was formed by using a high density mastering process using a $Kr^+$ ion laser as a light source, setting a shortest pit length of about 0.3 $\mu$m, a shortest track pitch of about 0.35 $\mu$m, and suitably changing the pit length, pit interval and track pitch. Although the details of evaluation will be described later, a beam having an $e^{-2}$ diameter of about 1 $\mu$m was used to carry out regeneration operations to examine the amplitudes of a regenerative signals in the case of various pit lengths and track pitches to quantitatively examine the resolution enhancing effect based on superresolution films.

The superresolution films 201 and 202 were selected from three combinations. That is, three combinations include a combination of a film of a photon mode system (a PM film) having a high speed time response with a film of a heat mode system (an HM film) having a relatively slow time response, a combination of a PM film with a PM film, and a combination of an HM film with an HM film.

The PM film may be selected from dye films, photochromic films, semiconductor films and so forth. In this example, a semiconductor fine-grain dispersed film was adopted. Specifically, a material containing CdSSe semiconductor fine grains dispersed in $SiO_2$ was used. By extending an optical gap by fine granulation, an absorption edge serving as a dispersed film was set so as to have a size of about 650 nm. If this material is used, the principle of operation serving as a superresolution film is the saturation of absorption due to light excitation as described above. After examining the time response characteristic using the evaluating system of FIG. 5, the time response ($\tau p$) was variable in the range of from 2 ns (nanoseconds) to 15 ns in accordance with the particle size.

The fact that the response time is 2 ns means that a response is made without lagging behind the rising of the pulse of pump light and that an actual response time is less than 2 ns. When the size of CdSSe particles was great, the response time was long, and when it was small, the response time was short. This is based on the fact that if the particle size is small, energy bands are discrete due to the quantum size effect, so that the saturation of absorption is easy to occur.

On the other hand, the HM film may be selected from a GeSbTe film having a composition facilitating a high speed crystallization, low melting point metal films of Sb, Bi, Te or the like, and thermochromic dyes. In this example, an Sb film was used. In order to enhance light absorption into the Sb film to enhance the sensitivity of the superresolution operation, interference films may be provided on the top and bottom of the Sb film if necessary. The time response of the variation in transmittance of the Sb film was also evaluated by the above described pump/probe system. As a result, the response of the Sb film depended on the thickness of the film, and was in the range of from 20 ns to 60 ns. When the thickness of the film was small, the heat capacity was small, and the response was quick.

The response time of the HM film can also be controlled by dispersion. That is, there is adopted a structure that Sb is dispersed in, e.g., $SiO_2$, similar to the above described PM film. In this case, the response time can be controlled by the size of Sb fine grains. As the particle diameter is small, the response is quick. With respect to the order of the stacking of superresolution films, if the HM film which is temperature-raised to about the melting point directly contacts the substrate, there is the possibility that the adoption of a practical resin substrate is limited. Therefore, in this example, the PM film was used as the first superresolution film 201, and the HM film was used as the second superresolution film 202.

In the example of the combination of the PM film with the PM film, the first and second superresolution films 201 and 202 have different time responses. In the combination of the HM film with the HM film, a dielectric film (not shown) for heat insulation and optical interference was provided between the first HM film 201 and the substrate 101. In addition, the PM film was formed by the simultaneous sputtering method using a semiconductor target and a dielectric target. In this simultaneous sputtering method, the percentage content of the semiconductor was controlled by adjusting the ratios of sputtering input to the respective targets, and the semiconductor fine-grain size was controlled by a sputter gas pressure, a sputtering power, and a bias power applied to the substrate if necessary, in addition to the percentage content of the semiconductor.

First, an example of a combination of a PM film with a PM film will be described.

As the PM film 201, a semiconductor fine-grain dispersed film having a CdSSe percentage content of 40 vol %, a CdSSe mean particle diameter of 5 nm and a response time of 4 ns was used, and as the PM film 202, a semiconductor fine-grain dispersed film having a CdSSe percentage content of 60 vol %, a CdSSe mean particle diameter of 15 nm and a response time of 10 ns was used. The thickness of each of the films was 50 nm. As the reflecting film 301, a usual Al alloy film was used, and the thickness thereof was 100 nm. It is assumed that this optical disk is a disk A1 according to the present invention.

On the other hand, in the example of the combination of the PM film with the HM film, the above described PM film 201 having a thickness of 30 nm was stacked on the Sb film 202 having a response time of 40 ns. The thickness of the reflecting film 301 was 100 nm. It is assumed that this disk is a disk A2 according to the present invention.

In addition, in the example of the combination of the HM film with the HM film, after a ZnS—SiO$_2$ film (not shown) having a thickness of 100 nm for both of heat insulation and interference was formed on the substrate 101, the above described Sb film having a thickness of 20 nm and a response time of 30 ns was provided as the first superresolution film 201, and Sb and SiO$_2$ were simultaneously sputtered to stack thereon the second superresolution film 202 having a thickness of 50 nm, an Sb percentage content of 50 vol %, an Sb mean particle diameter of 20 nm and a response time 25 ns. It is assumed that this disk is a disk A3 according to the present invention.

The inventor also prepared a comparative example in order to confirm the resolution enhancing effect of the present invention. That is, as the comparative example, a disk (a comparative disk C1) having a reflecting film provided directly on a pre-pit, and a disk (a comparative disk C2) having a monolayer superresolution film for use in the proposal for conventional superresolution disks, were prepared as usual read only memory disks, and were used for evaluating disks. The superresolution film in the comparative example was an Sb film having a thickness of 20 nm and a response time of 30 ns.

This disk evaluation was carried out by means of an optical disk evaluating system using a LD having a wavelength of 660 nm as an operating light source. In this system, the NA of the objective lens is 0.6, and the spot size of incident light beams is an e$^{-2}$ diameter of about 1 μm. In this spot size, intersymbol interference and crosstalk occur with respect to a disk having a pit length or pit interval of less than 1 μm, so that the intensity of a regenerative signal starts to fall. In a disk using only a reflecting film, in the case of a track pitch of 0.6 μm, it was difficult to obtain significant regenerative signals CNR if the pit pitch was less than 0.4 μm.

Figure 8B:
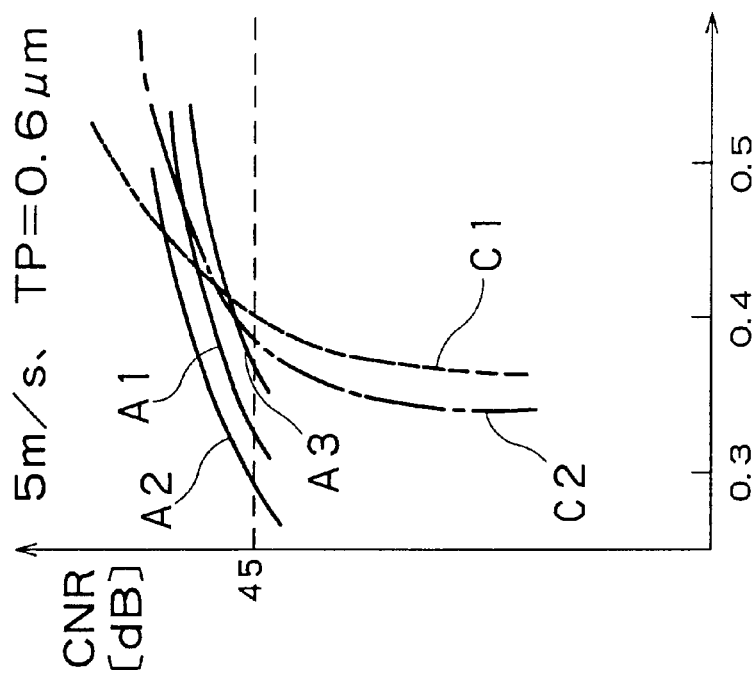
FIGS. 8A and 8B are graphs showing the measured values of regenerative signals CNR examined using a track pitch (TP) and pit pitch as parameters.
Figure 8A:
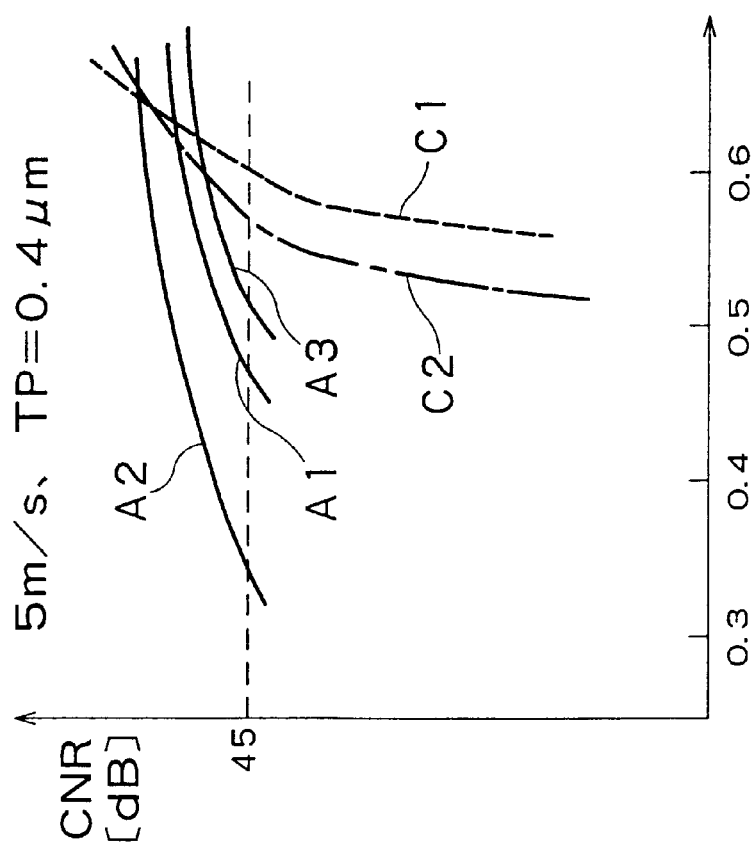

FIGS. 8A and 8B are graphs showing the measured values of regenerative signals CNR examined using a track pitch (TP) and a pit pitch as parameters. In this example of measurement, 5 m/sec was selected as a linear velocity. That is, the passing time in the e$^{-2}$ diameter of the light spot is 200 ns, and the passing time in the full width at half maximum (FWHM) is about 100 ns. The superresolution effect remarkably appears in a portion, in which the light intensity is strong within the range of the FWHM of the light spot. However, at a linear velocity of 5 m/sec, the FWHM passing time is 100 ns which is longer the τr of the superresolution film which is selected in this example. Therefore, the "overlapping portion" of the light spot with the optical aperture is formed, so that it is possible to carry out a significant superresolution reproducing operation.

In the measurement, the regenerative power was optimized every disk. Because the optical aperture is too small so that the signal is insufficient if the power is too low and because the optical aperture is too large so that the resolution is damaged if the power is excessive. In this example, the regenerative power having the minimum product (highest density) of a pit pitch and a track pitch, which was able to obtain CNR of 45dB, was examined every disk. Specifically, the regeneration of tracks having a constant track pitch and different pit pitches was carried out while changing the power, to obtain the relationship between the CNR and the pit pitch, so that data capable of obtaining the highest CNR with respect to the regenerative power was shown in FIGS. 8A and 8B.

FIG. 8A shows the measured results at TP=0.4 μm, and FIG. 8B shows the measured results at TP=0.6 μm. As can be clearly seen from the figures, the resolution of the disk having two superresolution films having different time responses according to the present invention is greatly improved as compared with the conventional disk C1 having no superresolution film and the conventional disk C2 having a single superresolution film. Among the examples of the present invention, the disk A2 comprising the combination of the PM film with the HM film was most effective, and had the greatest difference between the response times of the first and second superresolution films.

The inventor carried out the same experiments as those in FIGS. 8A and 8B, at various linear velocities of the disk. As a result, it was found that good results can be obtained in the following ranges assuming that the response time of a superresolution film having a shorter response is $\tau_{p1}$, the response time of a superresolution film having a slower response is $\tau_{p2}$, and the FWHM passing time of the light spot is ts.

$$Ts/8 \leq \tau_{p2} \leq ts/2$$

$$\tau_{p2}/8 \leq \tau_{p1} \leq \tau_{p2}$$

If $\tau_{p2}$ is too long with respect to the spot passing time, the "overlapping portion" of the light spot with the optical aperture of the superresolution film having the quick response is too small, so that the signal strength is reduced. On the other hand, if $\tau_{p2}$ is too short with respect to the spot passing time, the optical apertures of the two superresolution films are too close to each other, so that the resolution enhancing effect based on the double layer is not remarkable.

The relationship between $\tau_{p1}$ and $\tau_{p2}$ is the same. In addition, the desired relationship between ts, $\tau_{p1}$ and $\tau_{p2}$ depends on the used regenerative power and the power response of the superresolution films. Therefore, in the optical recording medium according to the present invention, it is also important to select a reproducing method capable of remarkably obtaining the effect.

While the present invention has been applied to the read only memory optical disk in the examples, the present invention should not be limited thereto. That is, the present invention may be applied to rewritable phase-change media and optical magnetic media.

Figure 9:
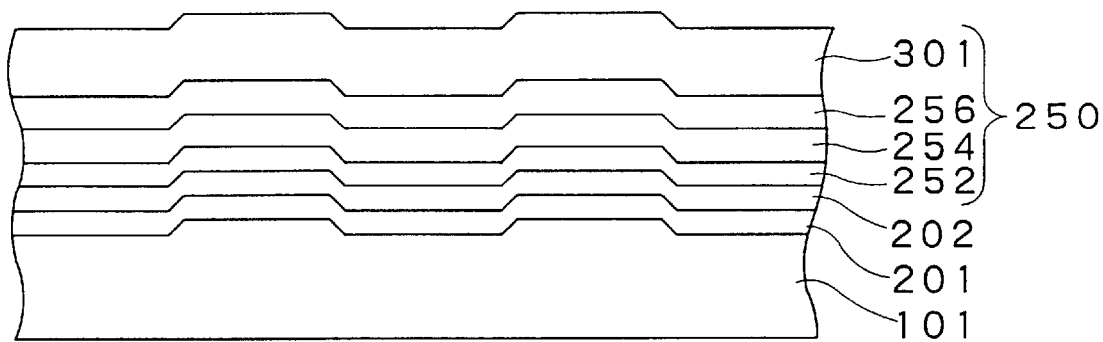
FIG. 9 is a schematic sectional view showing the construction of an example of a phase change medium according to the present invention.

FIG. 9 is a schematic sectional view of an example of a phase change medium according to the present invention. That is, a first superresolution film 201, a second sureresolving film 202, and a phase-change medium film part 250 of a multilayer film may be sequentially formed on an optical disk substrate 101 having a tracking group. The first and second superresolution films 201 and 202 may have the same construction as those in the above described example. If necessary, a dielectric film is provided between the substrate 101 and the first superresolution film 201 or between the superresolution film 202 and the phase-change medium film part 250.

For example, the phase-change medium film part 250 comprises a first interference film 252 of ZnS. $SiO_2$, a recording film 254 of SeSbTe, a second interference film 256 of ZnS. $SiO_2$ and a reflecting film 301 of an Al alloy are stacked sequentially in that order from the light incident side.

If the response of the superresolution film is adjusted so that the optical aperture is open at a regenerative power level, when the superresolution film is irradiated with recording light having a power about ten times as large as the regenerative power or with erasing light having a power about five times as large as the regenerative power, the beam reducing effect decreases. Therefore, the recording mark size is defined by the incident light spot size, i.e., wavelength and NA, (this is slightly smaller than that when no superresolution film is provided). However, since the resolution can be greatly improved during regeneration, the recording mark pitch can be reduced to carry out a recording. The read only memory disk can carry out a very high density recording since the recording density can be defined by a mastering machine. According to the present invention, it is possible to surely read such a high density disk. On the other hand, when the present invention is applied to a recordable optical disk having the construction shown in FIG. 9, a high density can be achieved due to the reduction of the mark pitch and track pitch although the recording density may be slightly reduced.

On the other hand, while the wavelength was 660 nm in the above described example, the present invention should not be limited to such a wavelength. When a semiconductor fine-grain dispersed film is used, the operating wavelength may be a short wavelength of, e.g., about 400 nm to about 410 nm, by adjusting the material, grain density and particle diameter of the semiconductor.

The semiconductor material may be selected in accordance with the wavelength of the used laser, and may be selected from Cu, halides of Ag, oxides of Cu, AgSe, AgTe, SrTe, SrSe, CaSi, ZnS, ZnO, ZnSe, ZnTe, CdS, CdSe, CdTe, AlTe, InS, InO, InSe, InSe, InTe, AlSb, AlN, AlAs, GaN, GaP, GaAs, GaSb, GeS, GeSe, SnS, SnSe, SnTe, PbO, SiC, AsTe, AsSe, SbS, SbSe, SbTe, BiS, TiO, MnSe, MnTe, FeS, MoS, CuAlS, CuInS, CuInSe, CuInTe, AgInS, AgInSe, AgInTe, ZnSiAs, ZnGeP, CuSbS, CuAsS, AgSbs and AgAsS.

On the other hand, the matrix, in which the semiconductor fine grains are dispersed, may be selected from transparent dielectric materials, such as $SiO_2$, $Si_3N_4$, $Ta_2O_5$, $TiO_2$ and ZnS. $SiO_2$, C—H and C—F plasma polymer materials, and C.

The number of the superresolution films should not be limited to two, but three or more superresolution films may be stacked.

Second Preferred Embodiment

As the second preferred embodiment of the present invention, a technique for preparing multilayered superresolution films (or a monolayer mixed with a plurality of superresolution materials having different response times) to extend the range of operating wavelength.

Figure 10:
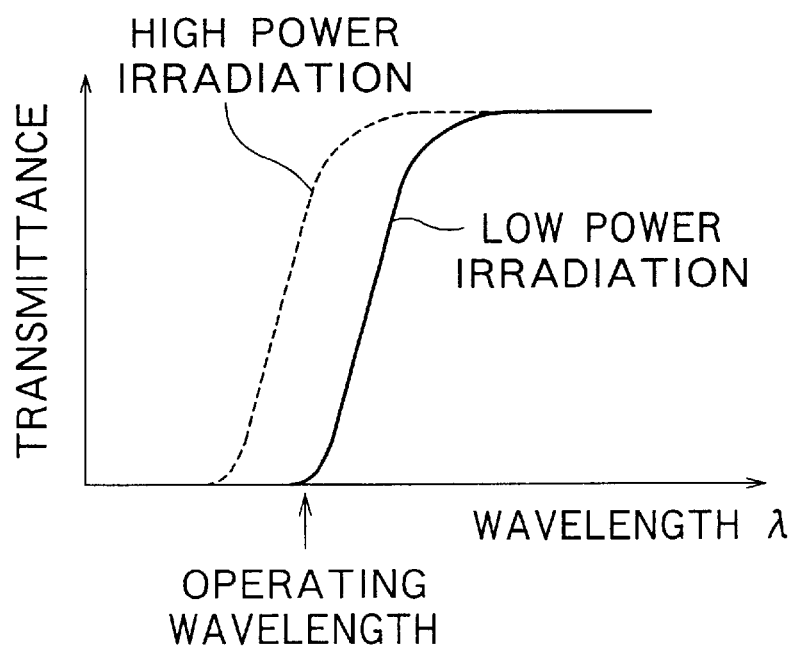
FIG. 10 is a graph showing a typical example of a wavelength dispersive characteristic of transmittance of a semiconductor.

FIG. 10 is a graph showing a typical example of a wavelength dispersive characteristic of transmittance of a semiconductor. In the case of the solid line of FIG. 10, the intensity of the monitored light is sufficiently low to correspond to the state that the transmittance is low in FIG. 1. When such a semiconductor is used as the material of the superresolution film, the semiconductor is set so that a portion near its base absorption edge has an operating wavelength. In the operating wavelength, electrons are excited from the filled band to the conduction band by the irradiation with light (more generally, optional two levels may be selected) to absorb light. If the light intensity is sufficiently high to excite most of electrons from the lower level to the upper level, the light absorption does not occur due to the absorption saturated phenomenon, so that the transmittance rises to appear the superresolution function.

If the absorption saturated phenomenon is grasped as the axis of wavelength (axis of energy), this is equivalent to the extension of the optical gap of the semiconductor. That is, a spectrum shown by the solid line in FIG. 10 during low power irradiation is shifted toward a short wavelength during high power irradiation as shown by the broken line in FIG. 10. In order to promote the superresolution function, the variation in transmittance is preferably greater by a smaller amount of wavelength shift from the point of view of sensitivity and contrast. In addition, the transmission spectrum preferably varies rapidly with respect to wavelength near the base absorption edge.

However, these characteristics are not desired in order to extend the operating wavelength range. For example, if the operating wavelength is extended to a longer wavelength range than the wavelength shown in FIG. 10, the transmittance is high both during low power irradiation (solid line data) and during high power irradiation (broken line data), although there is no problem if the operating wavelength is the wavelength shown in FIG. 10.

Figure 11A:
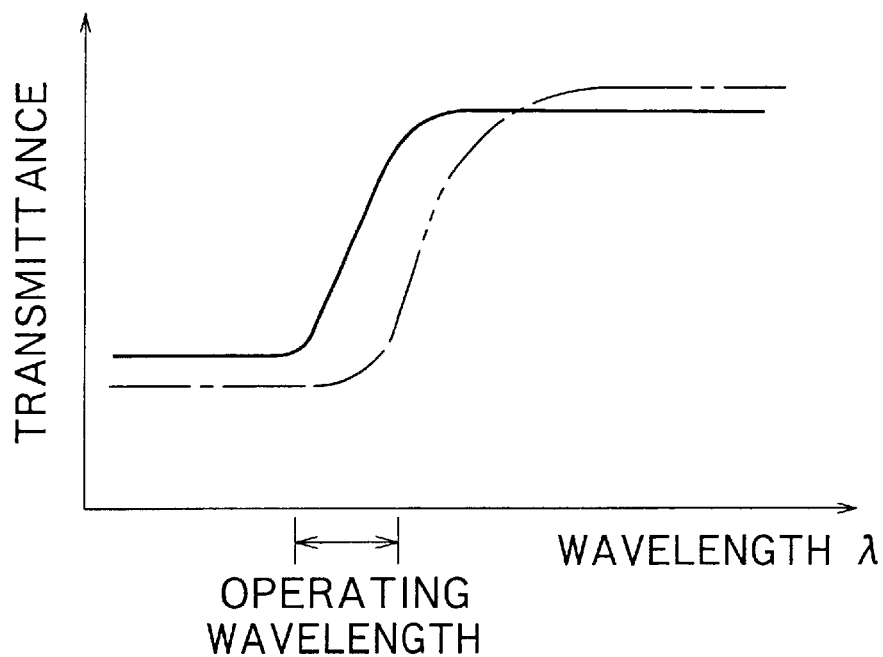
FIG. 11A is a graph schematically showing the dependence of transmittance on wavelength with respect to two kinds of superresolution films which have different wavelength response characteristics and which are used in the second preferred embodiment.

FIG. 11A is a graph schematically showing the dependence of transmittance on wavelength with respect to two kinds of superresolution films which have different wavelength response characteristics and which are used in this preferred embodiment. For example, when semiconductor fine-grain dispersed films are used as superresolution films, films having different base absorption edges are stacked. In addition, the respective superresolution films are adjusted so that the transmittance on the shorter wavelength side than the base absorption edge is not so low. Specifically, as shown in the example of FIG. 11A as an "operating range", although the transmittance of one of the superresolution films is set to be sufficiently high, the transmittance of the other superresolution film is set to be sufficient in the optical aperture even if it operates in a wavelength which is not so high. Such adjustment of transmittance can be carried out by the adjustment of the material and thickness of the respective superresolution films.

In the example of FIG. 11A, the operable wavelength range can be extended to about twice as large as that when a monolayer superresolution film is used. The effects of the multilayering of superresolution films to extend the operating wavelength range are great particularly with respect to superresolution films of the photon mode system, which have rapid wavelength response.

Figure 12A:
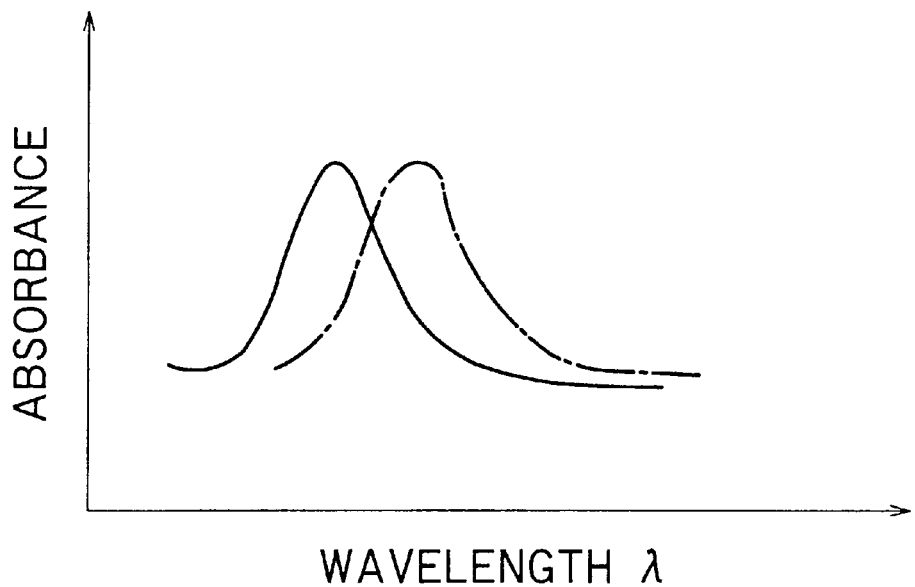
FIG. 12A is a graph showing two different absorption peak wavelengths of an HM film.

In the case of heat mode system, as shown in FIG. 12A, since the light transmittance varies with respect to wavelength even in the case of superresolution films of the heat mode system, the temperature of the films, i.e., the size of the optical aperture or mask depends on wavelength, so that it is possible to obtain the effects of the multilayering to extend the operating wavelength range.

Figure 11B:
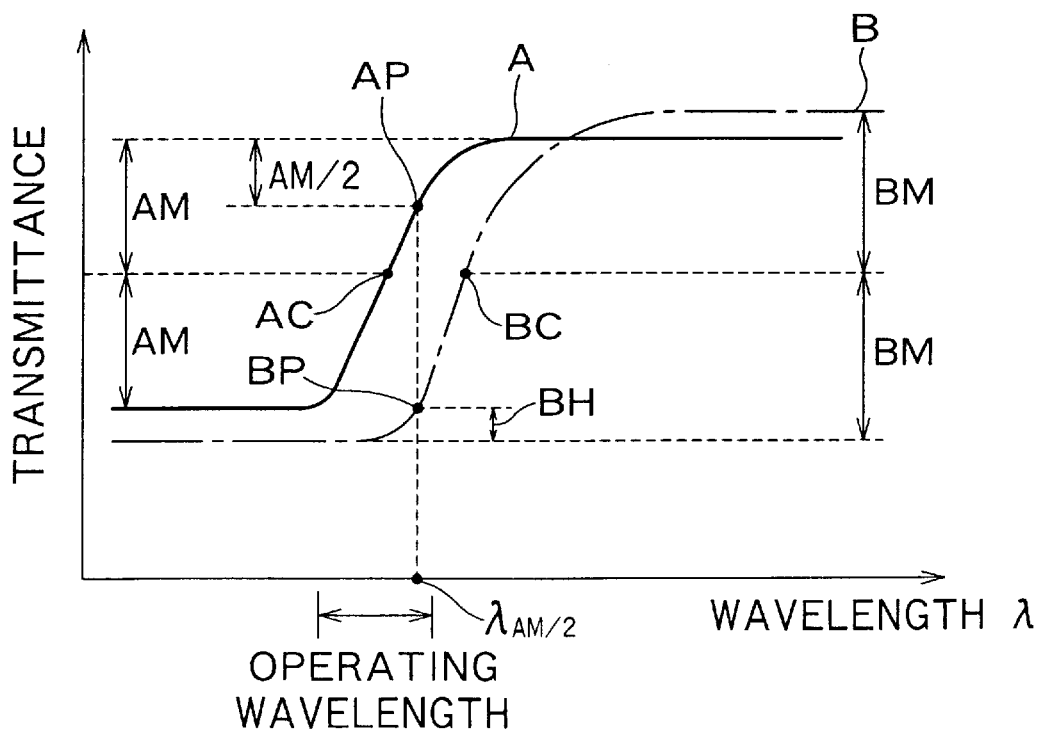
FIG. 11B is a graph for explaining a condition of combination in the case of PM superresolution films.
Figure 12B:
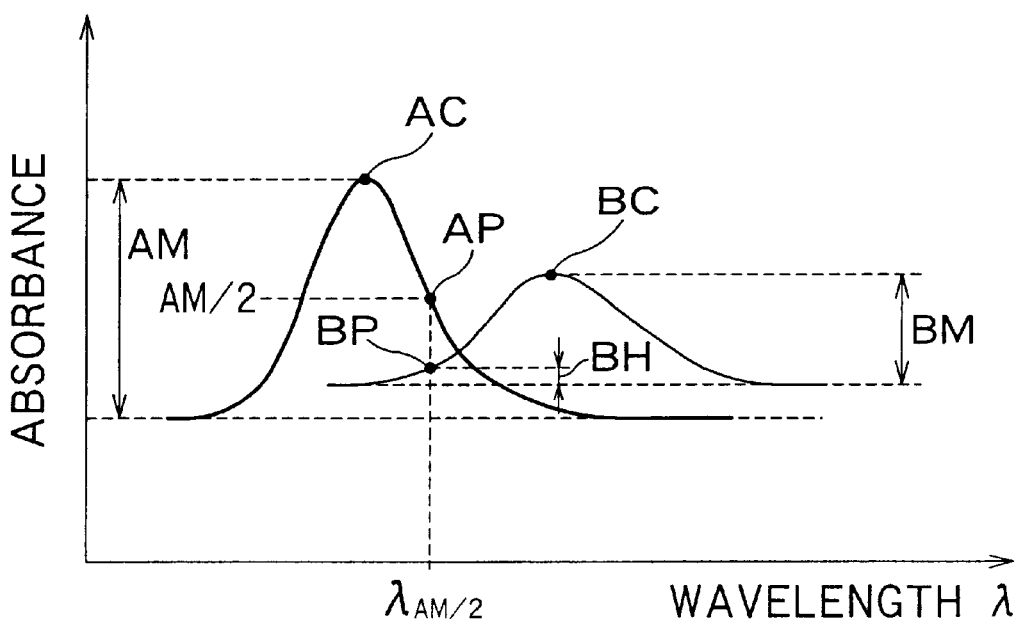
FIG. 12B is a graph for explaining a condition of combination in the case of HM superresolution films.

In order to extend the operating wavelength range effectively, it is preferable to combine superresolution films whose operating wavelengths are to some extent approximate each other. FIGS. 11B and 12B are schematic diagrams for explaining this condition of the combination.

First, the condition of combination in the case of PM films is explained below referring to FIG. 11B. FIG. 11B shows a transmittance characteristics of PM films A and B. A center point of the full variable range of the transmittance is defined as AC. The upper half variable range above the center point AC and the lower half variable range below the center point AC are defined as AM and AM, respectively. Similarly, the center point BC and the half variable range are defined for superresolution film B.

Then a point shifted by 50% of the half variable range AM (AM/2) from the center point AC is defined as AP, and the corresponding wavelength is defined as λAM/2. The point of the superresolution film B corresponding to this wavelength λAM/2 is defined as BP.

Under the above-explained definitions, it is preferable that the point BP is more than 25% away from the edge of the variable range. That is, in FIG. 11B, the distance BH may preferably be longer than BM/4. When this condition is met, the operating wavelenghs of PM films A and B are close enough to extend the operating wavelength of the system effectively.

Next, the condition of combination in the case of HM films is explained below referring to FIG. 12B. In the case of HM films, the peaks of absorbance are defined as center points AC and BC, respectively. The variable ranges AM and BM are defined as shown in the figure. Then a point shifted by 50% of the variable range (AM/2) from the center point AC is defined as AP, and the corresponding wavelength is defined as AM/2. The point of the superresolution film B corresponding to this wavelength λAM/2is defined as BP.

Under the above-explained definitions, it is preferable that the point BP is more than 25% away from the bottom of the variable range. That is, in FIG. 12B, the distance BH may preferably be longer than BM/4. When this condition is met, the operating wavelenghs of films A and B are close enough to extend the operating wavelength of the system effectively.

The above-explained conditions are necessary for either one or another film of the combination. The conditions need not to be met for both of the films to be combined at the same time. According to the present invention, by combining such superresolution films having operating wavelengths close to death other, the operating wavelength of the system can be effectively extended.

Examples of Second Preferred Embodiment

Examples of the second preferred embodiment of a multilayer superresolution optical disk for extending an operating wavelength range according to the present invention will be described below. The sectional structure of the optical disk in this preferred embodiment is the same as that in FIG. 7. Two superresolution films suitable for this preferred embodiment are films having the dependence of transmittance on wavelength shown in FIG. 11 in the case of PM films, and films having the dependence of transmittance on wavelength shown in FIG. 12 in the case of HM films.

The semiconductor fine-grain dispersed type PM films having different base absorption edges shown in the example of FIG. 11 can be obtained by, e.g., simultaneously sputtering CdSSe and $SiO_2$ to adjust the particle diameter of SdSSe. A film having a mean particle diameter of 2 nm has a base absorption edge on the short wavelength side (near 650 nm) as shown by the solid line in FIG. 11, and a film having a mean particle diameter of 10 nm has a base absorption edge near 655 nm.

In the case of the HM film shown in FIG. 12 as an example, it is difficult to form different two absorption peak wavelengths in, e.g., a single Sb film. However, if interference films are arranged on the top and bottom of the superresolution film, the dependence of absorption on wavelength can be adjusted by the multiple interference effect. In addition, if an Sb film and a Te film are stacked and if an interference film is sandwiched therebetween, the absorption peak wavelength can be suitably adjusted.

Figure 13:
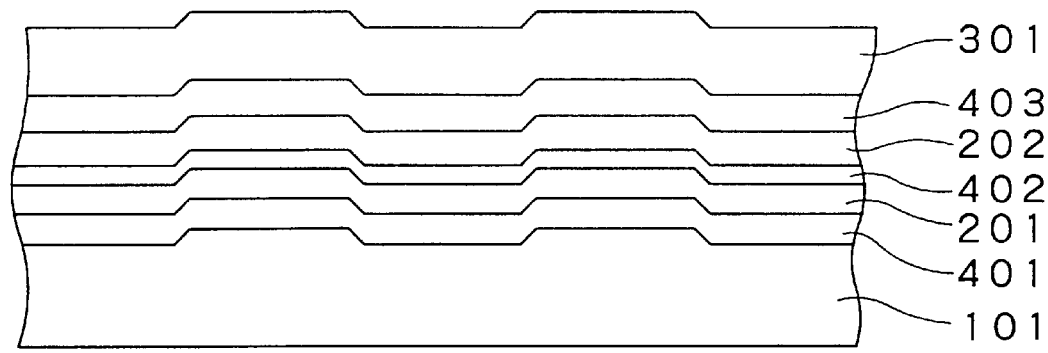
FIG. 13 is a schematic sectional view showing the construction of a preferred embodiment of an optical disk according to the present invention.

FIG. 13 is a conceptual diagram showing the sectional construction of an optical disk in this example. That is, a ZnS—$SiO_2$ film 401 having a thickness of 100 nm, a first superresolution film 201 of Sb having a thickness of 20 nm, a ZnS—$SiO_2$ film 402 having a thickness of 15 nm, a second superresolution film 202 of Te having a thickness of 10 nm, a ZnS—$SiO_2$ film 402 having a thickness of 15 nm, and a reflecting film 301 of an Al alloy having a thickness of 100 nm are sequentially stacked on a substrate 101. The absorption peak wavelength of the first superresolution film 201 was adjusted to be 650 nm, and the absorption peak wavelength of the second superresolution film 202 was adjusted to be 660 nm. The absorption characteristics of the films 201 and 202 were adjusted so that the condition explained with regard to FIG. 12B could be met.

The adjustment of the absorption peak wavelength can be carried out by measuring the dependence of optical constants of the respective layers on wavelength by means of an ellipsometer to optically calculate the thickness of each of the layers. Also in this preferred embodiment similar to the above described first preferred embodiment, both of a PM film and a HM film may be used as the first and second superresolution films 201 and 202. As described above, in the case of the combination of semiconductor fine-grain dispersed type PM films having base absorption edges at 650 nm and 655 nm, some operations of a disk was attempted at operating wavelengths of 635 nm to 680 nm. Operation conditions were set so as to have TP=0.4 µm, a pit pitch of 0.5 µm and a linear velocity of 5 m/sec. The regenerative power was selected so as to have the optimum value at each wavelength. The way of selecting the optimum value is the same as that in the above described first preferred embodiment.

When a semiconductor fine-grain dispersed film was used as the superresolution film, the optimum regenerative power was shifted toward a high power as the operating wavelength was shorter, since a power density required to saturate absorption increases as the wavelength is shifted from the base absorption edge to a shorter wavelength.

Figure 14:
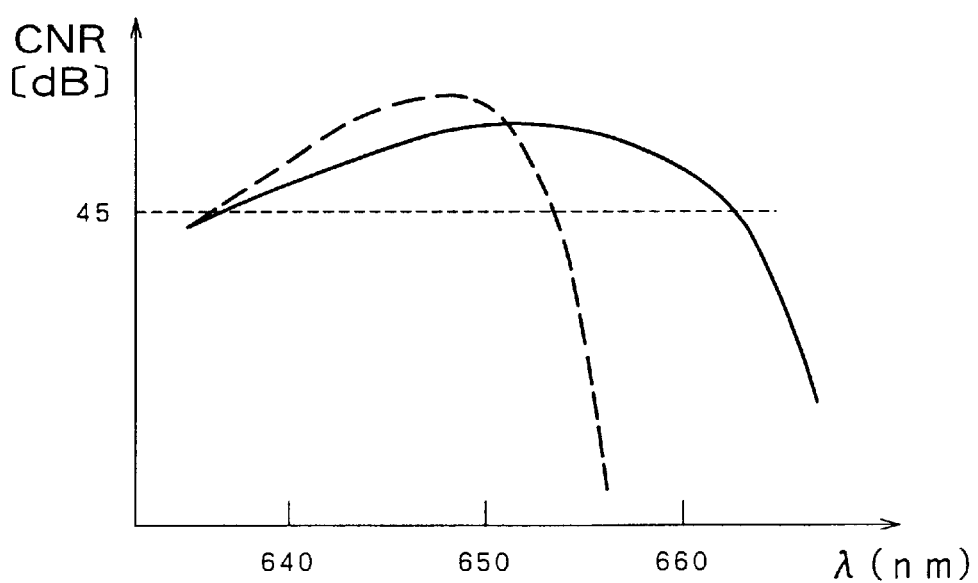
FIG. 14 is a graph showing the evaluated results of the preferred embodiment of an optical disk according to the present invention.

FIG. 14 is a graph showing the evaluated results of an optical disk in this preferred embodiment. That is, this figure shows the dependence of CNR with respect to the regenerative wavelength. In this figure, the solid line corresponds to a case where two superresolution films having different wavelength responses are used according to the present invention, and the broken line corresponds to a case where a monolayer superresolution film having a base absorption edge near 650 nm is used as a comparative example. In FIG. 14, a range capable of obtaining a CNR having 45 dB or more is a broad range of 635 nm to 665 nm in the case of an optical disk according to the present invention (solid line), whereas it is a narrow range of 635 nm to 654 nm in the case of the comparative example. That is, according to the present invention, it is possible to extend the operating wavelength range.

In addition, the number of superresolution films should not be limited to two, but three or more superresolution films may be stacked.

Furthermore, disks applied to the second preferred embodiment of the present invention should not be limited to read only memory disks, but this preferred embodiment may be applied to phase-change media and optical magnetic media. In addition, there is no limit to the way of selecting the operating wavelength.

Third Preferred Embodiment

Finally, an optical reproducing system, which can suitably use an optical recording medium according to the present invention, will be described below.

Figure 15:
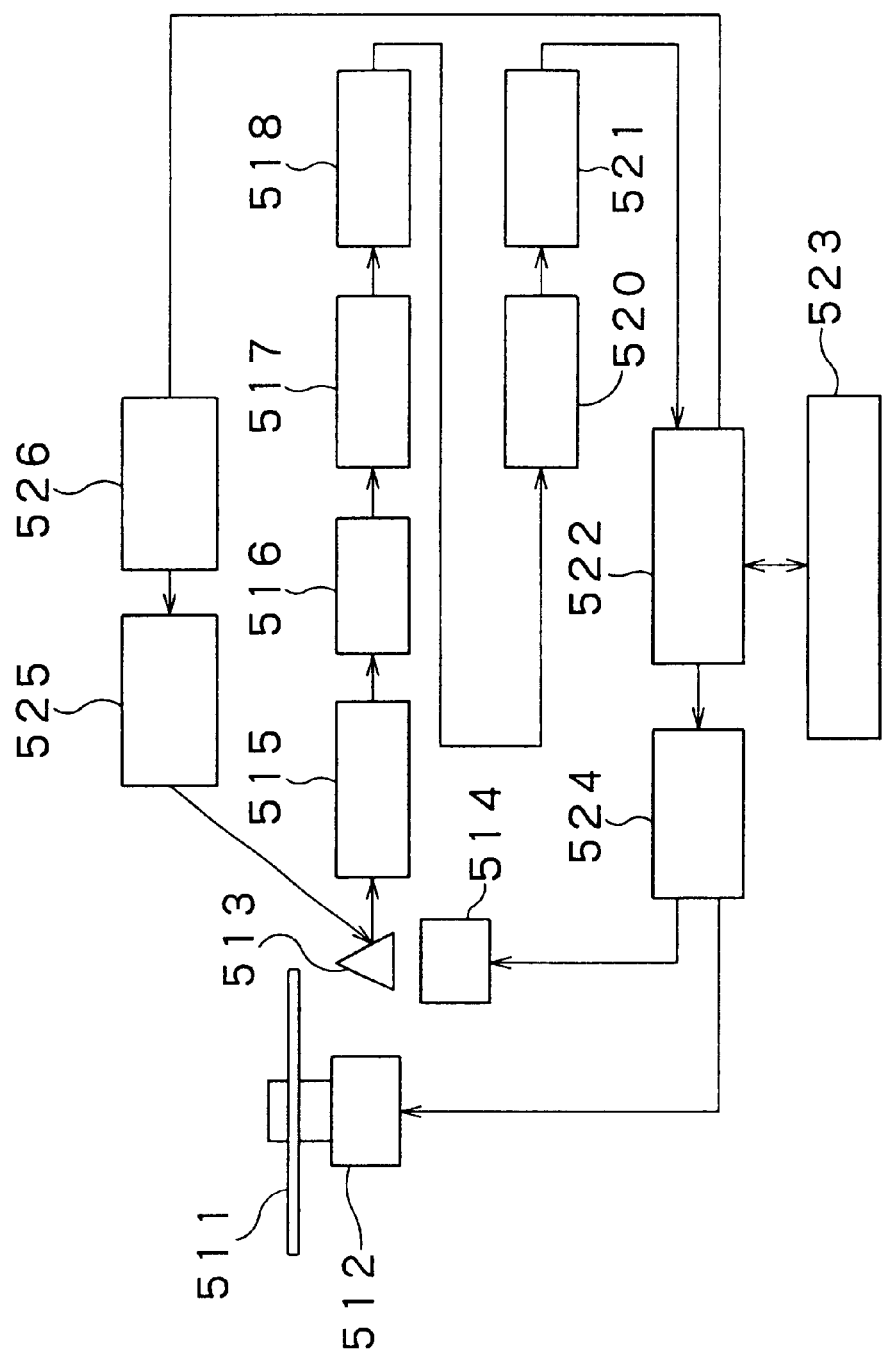
FIG. 15 is a block diagram of a principal part of a preferred embodiment of an optical recording and/or reproducing system according to the present invention.

FIG. 15 is a block diagram showing a principal part of a preferred embodiment of an optical reproducing system according to the present invention. That is, the optical reproducing system shown in this figure as an example is a recording/reproducing type optical disk system also having a recording function, and has a light irradiation means for irradiating with light, a data reproducing means for reading data and a data recording means for writing data. FIG. 15 also shows a state that a disk 511 serving as an optical recording medium is mounted.

The disk 511 is detachably mounted in an optical recording and/or reproducing system, and rotated by a spindle motor 512 when it is mounted therein.

An optical pickup has a laser light source for irradiating the recording face of the optical disk 511 with light beams, and a photo detecting system for detecting reflecting beams from the recording face.

The light irradiation means has a laser light source, provided in a pickup 513, for irradiating the light irradiated face of the optical disk 511 with optical beams. At this time, the light irradiated face is irradiated with optical beams via the above described superresolution film in any one of the first and second preferred embodiments. Such a superresolution film is most preferably provided in the optical disk 511, but it may be provided between the optical disk 511 and the optical pickup 513 or in the optical pickup 513.

The optical pickup 513 is moved and adjusted by a servomotor 514, and driven by a laser driver 525 to irradiate the optical disk 511 with laser light to optically record and/or reproduce information. The spindle motor 512 and the servomotor 514 are driven and controlled by a drive controller 522 via a drive control circuit 524.

The data reproducing means includes a photo detecting system provided in the optical pickup 513, and a regenerative signal processing circuit. The regenerative signal circuit has a preamplifier 515, a variable gain amplifier (VGA) 516, an A/D converter circuit 517, a linear equalizer circuit 518, a data detecting circuit 520 and a decoder 521. The preamplifier 515 and the VGA 516 are designed to amplify a regenerative signal which is read by the optical pickup 513. The A/D converter circuit 517 is designed to convert the amplified regenerative signal to a digital signal which is a quantized sample value of discrete time.

The linear quantizer circuit 518 is a kind of digital filter. For example, the data detecting circuit 520 is a signal processing circuit of a maximum likelihood series estimating system for detecting data from a regenerative signal waveform which is equalized by a partial response. Specifically, the data detecting circuit 520 comprises a viterbi decoder. The decoder 521 is designed to restore a sign bit string, which is detected by the data detecting circuit 520, to the original recorded data.

The data recording means has a laser driver 525 and a modulator circuit 526. The modulator circuit 526 is designed to carry out a coding processing for converting recorded data, which are transmitted from the drive controller 522, to a predetermined sign bit string. The laser driver 525 is designed to drive the optical pickup 513 so as to record marks, which correspond to the code bit string outputted from the converter circuit 526, on the disk 511.

Furthermore, it is not always required to have a series of data storing means, and it may be a system having only a data reproducing means, i.e., an optical reproducing system.

The drive controller 522 is a main control system of the system. The drive controller 522 is connected to, e.g., a personal computer or a television receiver, via an interface 523 to carry out the transfer and control of recorded and/or reproduced data. Furthermore, this system include a dynamic image compressing circuit (not shown) and dynamic image decompressing circuit (not shown), which are required to record and/or reproduce image information, and an error detecting/correcting circuit for carrying out an error detection/correction processing (not shown) for data which are demodulated by a demodulator circuit 520.

If the optical recording medium 511 is recordable, the formation of erasing light for erasing recorded data is carried out in, e.g., the modulator circuit 526. That is, the modulator circuit 526 is designed to carry out a coding processing for converting recorded data, which are transmitted from the drive controller 522, to a sign bit string. For example, in the case of a phase change type recording medium, the modulator circuit 526 is designed to generate erasing light or its pulse train, which has a smaller erasing power level than a recording power level, as a signal for erasing data.

This erasing light is determined so as to heat the recording layer part of the optical disk to a temperature zone having a high crystal growth rate Rg and a temperature zone having a high crystalline nucleus producing frequency v x, respectively. Therefore, the kind, level, width and number of pulses constituting the erasing light are suitably determined in accordance with the material of the recording layer part and optical characteristics of the laser.

In addition, it is desired to optimize the regenerative light power in accordance with the linear velocity when reproduction is carried out. Because the optical aperture is too small so that the signal strength is insufficient if the power is too low, and because the aperture is too large so that the resolution is damaged if the power is excessive.

The above described reproducing system according to the present invention is designed to irradiate the recording face of the optical disk with light beams via the above described superresolution film in the first or second preferred embodiment. Therefore, the reproducing system according to the present invention has following structural characteristics.

First, in the reproducing system according to the present invention, the passing time of the light spot, i.e., ($e^{-2}$ diameter/linear velocity), is controlled so as not to be higher than $\tau r$ of a superresolution film having a slow response, and more preferably controlled so as not to be higher than $\tau p$. Because this corresponds to a rate, at which the optical aperture is formed in the superresolution film.

Secondly, in the reproducing system according to the present invention, the power of the recording light beams is controlled so as to be within a range which is necessary and sufficient to vary the transmittance of the superresolution film. Specifically, assuming that the power of the regenerative light beams is Pr and the irradiation light intensity for varying the variation in transmittance of the superresolution film is P, a relationship of $P \leq Pr \leq 3P$ is preferably established. The irradiation light intensity P is an irradiation light intensity near the center of a portion, in which the transmittance changes, in the graph of FIG. 1. Because, if Pr is smaller than the above described range, the optical aperture is difficult to be formed in the superresolution film, whereas if Pr is greater than the above described range, there is some possibility that data are erased or written in the optical recording medium and that the superresolution film is deteriorated by irradiation with light.

Thirdly, in the reproducing system according to the present invention, Pr is controlled in accordance with the variation in linear velocity of light beams so that the linear velocity of light beams is within the range of the passing time of the light spot described in the above described first characteristic and satisfies the range described in the above described second characteristic. That is, from the point of view of the reproducing energy density, the range of Pr varies in accordance with the linear velocity, so that it is required to adapt this variation.

Fourthly, the reproducing system according to the present invention selectively has means for carrying out a test reproduction or a test recording and/or reproduction with respect to the optical disk and for determining the conditions satisfying the above described first through third characteristics. That is, there is some possibility that the optimum of the passing time of the light spot and the optimum value of the regenerative power are different every optical disk. Therefore, the test reproduction or test recording and/or reproduction may be carried out to examine their optimum values to carry out a reproduction on the basis of the obtained optimum values.

On the other hand, in addition to the examples described with regard to the first and second embodiment of the invention, various structures can be employed for the optical recording medium of the present invention as well.

Figure 16A:
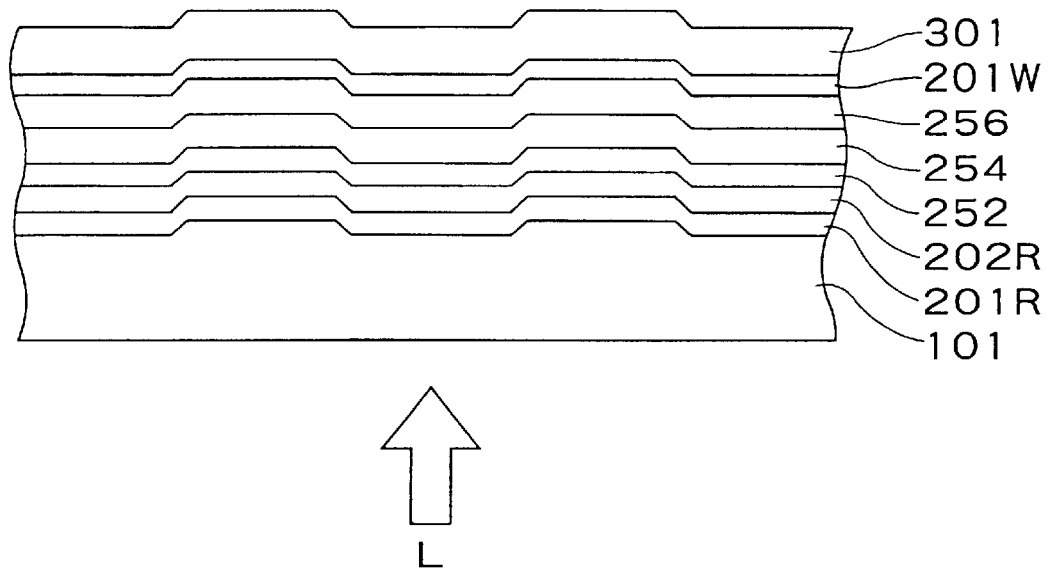
FIGS. 16A–16C show schematic cross sectional views of the optical recording media according to the present invention.
Figure 16B:
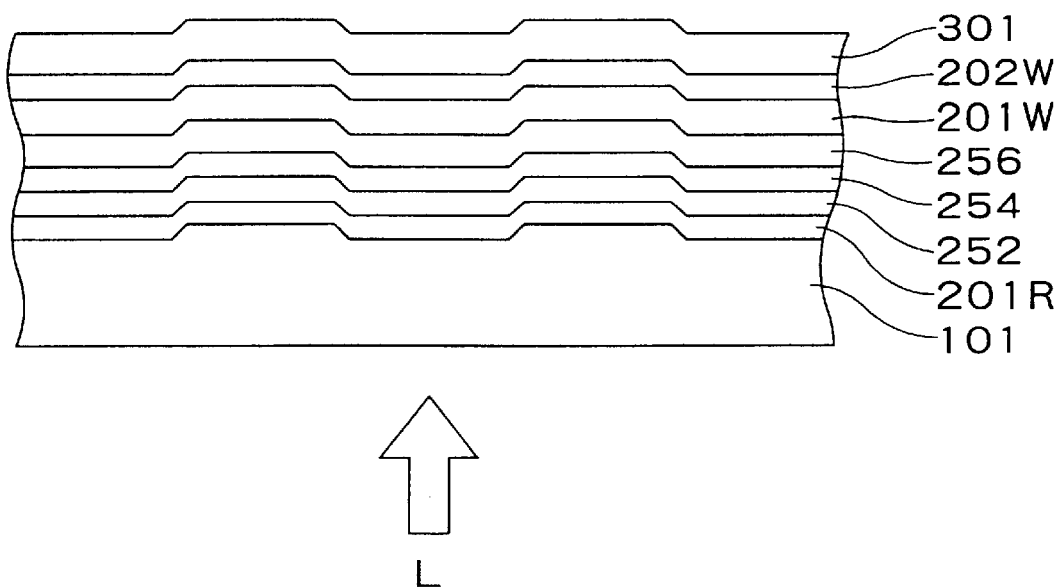
Figure 16C:
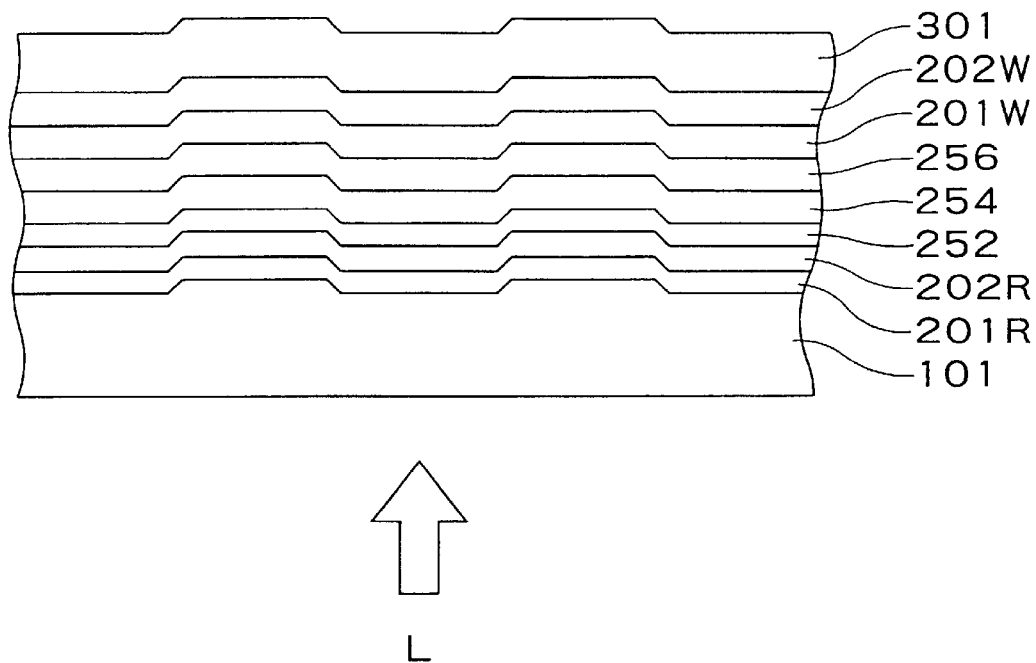

FIGS. 16A–16C show schematic cross sectional views of the optical recording media according to the present invention.

First, the recording medium shown in FIG. 16A has a layered structure including a first superresolution film 201R, a second superresolution film 202R, a first optical interference film 252, a recording film 254, a second optical interference film 256, a third superresolution film 201W and a reflecting film 301, on a transparent substrate 101.

The substrate 101, a first optical interference film 252, a recording film 254, a second optical interference film 256 and a reflecting film 301 can be similar to the ones explained with regard to FIGS. 7, 9 and 13.

The first and second superresolution films 201R and 202R have a similar features as the ones explained with regard to the first and second embodiments of the invention. Thus, these superresolution films effectively reduce the spot size of the data-reading laser beam to achieve the much improved resolution. The third superresolution film 201W reduces the spot size of the data-writing laser beam.

Figure 16D:
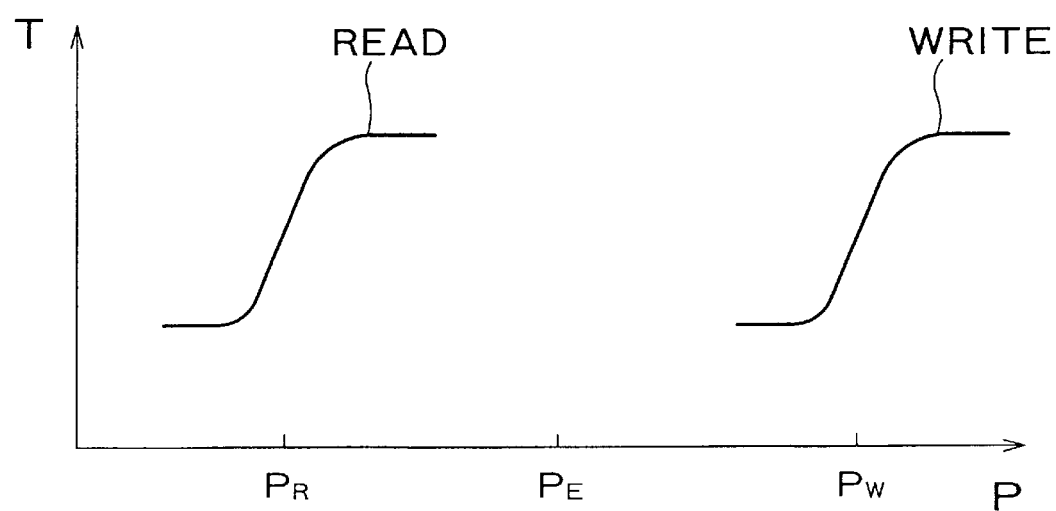
FIG. 16D is a graph showing transmittance characteristics of superresolution films for data-reading and data-writing.

FIG. 16D is a graph showing transmittance characteristics of superresolution films for data-reading and data-writing. The horizontal axis of the graph shows input power of the incident laser beam and the vertical axis shows transmittance of the superresolution films.

In the case of the rewritable medium, a power of the data-erasing laser beam $P_E$ is about five times larger and a power of the data-writing laser beam is about ten times larger than that of the data-reading laser beam $P_R$ respectively. The first and second superresolution films 201R and 202R have transmittance characteristics which correspond to the power level of the data-reading beam $P_R$. The third superresolution film 201W has a transmittance characteristics which corresponds to the power level of the data-writing beam $P_W$.

As can be seen in FIG. 16D, when data-erasing or data-writing is performed, the transmittances of the first and second superresolution films 201R, 202R are at high level, thus the laser beam can reach the recording layer 254 without obstructed. The laser beam is then partially absorbed by the recording layer 254 then transmits therethrough.

The recording medium is designed so that only the absorbed energy at this stage is not enough to cause a data-writing even if the irradiated power level is at $P_W$. The recording medium is adjusted so that the recording layer 254 is heated up to its data-writing temperature when the beam reflected by the layer 301 irradiates the recording layer 254. Such adjustment can be done by properly designing the material of the layer 254, intensity of the incident laser beam L and/or optical characteristics of the interference films 252 and 256.

Thus, when the data-writing beam having a power $P_W$ is irradiated, the spot size of the beam transmitted through the recording layer 254 is reduced by the third superresolution film 201W and reflected by the layer 301 to irradiate the layer 254. The irradiated part of the recording layer 254 is heated up to the data-writing temperature. Accordingly, a data-writing with a high resolution can be made by utilizing an assistance of a reflected beam whose spot size is reduced by the third superresolution film 201W.

In the case of the optical recording medium shown in FIG. 16B, a layered structure including a first superresolution film 201R, a first optical interference film 252, a recording film 254, a second optical interference film 256, a second superresolution film 201W, a third superresolution film 202W and a reflecting film 301 is formed on a transparent substrate 101.

In this specific example, the spot size of a data-reading laser beam is reduced by the first superresolution film 201R, thus a data-reading with a high resolution can be performed.

On the other hand, the spot size of a data-writing laser beam is reduced by the second and the third superresolution films 201W and 202W. The reduced beam is reflected by the layer 301 then irradiates the recording layer 254, thus the irradiated part is heated up to form a recording pit. The second and the third superresolution films 201W and 202W have a similar features as the ones explained with regard to the first and second embodiments of the invention.

In the case of the optical recording medium shown in FIG. 16C, a layered structure including a first superresolution film 201R, a second superresolution film 202R, a first optical interference film 252, a recording film 254, a second optical interference film 256, a third superresolution film 201W, a fourth superresolution film 202W and a reflecting film 301 is formed on a transparent substrate 101.

In this specific example, the spot size of a data-reading laser beam is reduced by the first and the second superresolution films 201R and 202R, thus a data-reading with a high resolution can be performed.

On the other hand, the spot size of a data-writing laser beam is reduced by the second and the third superresolution films 201W and 202W. The reduced beam is reflected by the layer 301 then irradiates the recording layer 254, thus the irradiated part is heated up to form a recording pit.

The first and the second superresolution films 201R and 202R, and the third and the fourth superresolution films 201W and 202W have a similar features as the ones explained with regard to the first and second embodiments of the invention, respectively.

Referring to the examples, the preferred embodiments of the present invention have been described. However, the present invention should not be limited to these examples.

For example, while the four-layer structure comprising the first interference film, the recording film, the second interference film and the reflecting film which have been stacked in that order from the substrate side has been used in the examples of FIGS. 9 and 16A–16C a five-layer structure having an Au translucent film provided in the four-layer structure may be used as well.

In addition, in the case of the five-layer film structure, the translucent layer may be selected from silver (Ag), copper (Cu) and silicon (Si) films in addition to the Au film, and from a film having a structure wherein metal fine grains are dispersed in a dielectric matrix. The interference layer may be suitably selected from dielectric films of $Ta_2O_5$, $Si_3N_4$, $SiO_2$, $Al_2O_3$ and AlN in addition to $ZnS$—$SiO_2$. The recording layer may be selected from chalcogen films of InSbTe, AgInSbTe and GeTeSe in addition to GeSbTe. The reflecting layer may be suitably selected from Al alloy films of AlCr and AlTi in addition to AlMo.

Moreover, while the optical disk has been described as an example of an optical recording medium in the above described examples, the present invention should not be limited thereto. For example, the present invention may be applied to various optical recording media, such as an optical recording card, to obtain the same effects.

While the present invention has been disclosed in terms of the preferred embodiment in order to facilitate better understanding thereof, it should be appreciated that the invention can be embodied in various ways without departing from the principle of the invention. Therefore, the invention should be understood to include all possible embodiments and modification to the shown embodiments which can be embodied without departing from the principle of the invention as set forth in the appended claims.

The entire disclosure of Japanese Patent Application No.H11-238095 filed on Aug. 25, 1999 including specification, claims, drawings and summary is incorporated herein by reference in its entirety.

What is claimed is:

1. An optical recording medium comprising a superresolution layer which has a light transmittance varying in accordance with intensity of incident light and which has a superresolution function for optically masking part of incident light to form an optical aperture having a smaller size than a spot size of incident light,
said superresolution layer including at least two kinds of stacked superresolution films having different response times until said superresolution function occurs after being irradiated with light,
said apertures formed in each of said at least two kinds of superresolution films partially overlapping with each other.

2. The optical recording medium as set forth in claim 1, wherein said partially overlapping apertures reduce a spot size of a light beam for data-reading.

3. The optical recording medium as set forth in claim 1, wherein said partially overlapping apertures reduce a spot size of a light beam for data-writing.

4. The optical recording medium as set forth in claim 1, wherein said at least two kinds of superresolution films are stacked so that one superresolution film having a shorter response time is irradiated by said incident light earlier than another one superresolution film having a relatively longer response time.

5. The optical recording medium as set forth in claim 1, wherein said at least two kinds of superresolution films include at least two kinds of stacked superresolution films having different operating wavelengths that cause said superresolution function.

6. The optical recording medium as set forth in claim 1, wherein at least one kind of said at least two kinds of superresolution films is a superresolution film that causes said superresolution function based on electron transitions.

7. The optical recording medium as set forth in claim 1, wherein at least one kind of said at least two kinds of superresolution films is a superresolution film that causes said superresolution function based on a temperature rise.

8. The optical recording medium as set forth in claim 1, further comprising:
a substrate;
a recording layer provided on said substrate; and
a reflecting layer provided on said recording layer,
wherein said at least two kinds of superresolution films are interposed between said substrate and said recording layer.

9. The optical recording medium as set forth in claim 1, further comprising:
a substrate;
a recording layer provided on said substrate; and
a reflecting layer provided on said recording layer,
wherein said at least two kinds of superresolution films are interposed between said recording layer and said reflecting layer.

10. An optical recording medium comprising a superresolution layer which has a light transmittance varying in accordance with the intensity of incident light and which has a superresolution function for optically masking part of incident light to form an optical aperture having a smaller size than a spot size of incident light,
said superresolution layer including at least two kinds of stacked superresolution layers having different operating wavelengths causing said superresolution function, said apertures formed in each of said at least two kinds of superresolution films partially overlapping with each other.

11. The optical recording medium as set forth in claim 10, wherein said at least two kinds of superresolution films have operating wavelengths which are close so that variable ranges of optical characteristics partially overlap with each other.

12. The optical recording medium as set forth in claim 4, wherein, at a wavelength where said optical characteristics of one of said at least two kinds of superresolution films is at 50% of said variable range thereof, said optical characteristics of another one of said at least two kinds of superresolution films is at equal to or higher than 25% of said variable range thereof.

13. An optical reproducing method comprising:

preparing at least two kinds of superresolution films, each of which has a light transmittance varying in accordance with the intensity of incident light and each of which has a superresolution function for optically masking part of incident light to form an optical aperture having a smaller size than a spot size of incident light, said at least two kinds of superresolution films having different response times until said superresolution function occurs after being irradiated with light;

irradiating said at least two kinds of superresolution films with a light beam for reading data so that said apertures formed in said at least two kinds of superresolution films partially overlap with each other, to irradiate an optical recording face of an optical recording medium with said light beam via said optical apertures partially overlapping with each other; and detecting reflection of said light beam, with which said optical recording face is irradiated, to read data.

14. An optical reproducing method comprising:

preparing at least two kinds of superresolution films, each of which has a light transmittance varying in accordance with the intensity of incident light and each of which has a superresolution function for optically masking part of incident light to form an optical aperture having a smaller size than a spot size of incident light, said at least two kinds of superresolution films having different operating wavelengths causing said superresolution function;

irradiating said at least two kinds of superresolution films with a light beam for reading data so that optical apertures formed in said at least two kinds of superresolution films partially overlap with each other, to irradiate an optical recording face of an optical recording medium with said light beam via said optical apertures partially overlapping with each other; and detecting reflection of said light beam, with which said optical recording face is irradiated, to read data.

15. An optical reproducing system comprising:

a light source configured to irradiate at least two kinds of superresolution films, each of which has a light transmittance varying in accordance with the intensity of incident light and each of which has a superresolution function for optically masking part of incident light to form an optical aperture having a smaller size than a spot size of incident light, said at least two kinds of superresolution films having different response times until said superresolution function occurs after being irradiated with light, with a light beam for reading data so that said apertures formed in said at least two kinds of superresolution films partially overlap with each other, to irradiate an optical recording face of an optical recording medium with said light beam via said optical apertures partially overlapping with each other; and a detector configured to detect reflection of said light beam, with which said optical recording face is irradiated by said light source, to read data.

16. An optical reproducing system comprising:

a light source configured to irradiate at least two kinds of superresolution films, each of which has a light transmittance varying in accordance with the intensity of incident light and each of which has a superresolution function for optically masking part of incident light to form an optical aperture having a smaller size than a spot size of incident light, said at least two kinds of superresolution films having different operating wavelengths causing said superresolution function, with a light beam for reading data so that apertures formed in said at least two kinds of superresolution films partially overlap with each other, to irradiate an optical recording face of an optical recording medium with said light beam via said optical apertures partially overlapping with each other; and a detector configured to detect reflection of said light beams, with which said optical recording face is irradiated by said light source, to read data.

* * * * *